US012452907B2

(12) United States Patent
Abdelghaffar et al.

(10) Patent No.: US 12,452,907 B2
(45) Date of Patent: Oct. 21, 2025

(54) PHYSICAL RANDOM ACCESS CHANNEL FOR UPLINK-SUBBAND IN SUBBAND FULL DUPLEX

(71) Applicant: QUALCOMM Incorporated, San Diego, CA (US)

(72) Inventors: Muhammad Sayed Khairy Abdelghaffar, San Jose, CA (US); Hung Dinh Ly, San Diego, CA (US); Gokul Sridharan, Sunnyvale, CA (US); Ahmed Attia Abotabl, San Diego, CA (US); Seyedkianoush Hosseini, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/049,212

(22) Filed: Oct. 24, 2022

(65) Prior Publication Data

US 2024/0137972 A1 Apr. 25, 2024
US 2024/0237055 A9 Jul. 11, 2024

(51) Int. Cl.
| | |
|---|---|
| *H04W 74/00* | (2009.01) |
| *H04L 5/00* | (2006.01) |
| *H04L 5/14* | (2006.01) |
| *H04W 56/00* | (2009.01) |
| *H04W 72/0446* | (2023.01) |

(Continued)

(52) U.S. Cl.
CPC ......... *H04W 74/006* (2013.01); *H04L 5/0098* (2013.01); *H04L 5/14* (2013.01); *H04W 72/0446* (2013.01); *H04W 74/0833* (2013.01); *H04W 56/001* (2013.01)

(58) Field of Classification Search
CPC ......... H04W 74/0833; H04W 72/0446; H04W 74/006; H04W 56/001; H04L 5/14; H04L 5/0098
See application file for complete search history.

(56) References Cited

U.S. PATENT DOCUMENTS

| | | | |
|---|---|---|---|
| 2020/0229242 A1* | 7/2020 | Xiong | H04W 74/002 |
| 2022/0191936 A1* | 6/2022 | Shin | H04W 74/004 |
| 2023/0054111 A1* | 2/2023 | Rudolf | H04W 74/0833 |

(Continued)

*Primary Examiner* — Brian D Nguyen
(74) *Attorney, Agent, or Firm* — Holland & Hart LLP

(57) ABSTRACT

Methods, systems, and devices for wireless communications are described. A user equipment (UE) may receive control signaling that indicates a configuration for subband full duplex (SBFD) slots and a random access channel (RACH) configuration for SBFD slots. The UE may transmit at least one instance of a RACH message in an uplink subband of an SBFD slot in accordance with the RACH configuration. The RACH configuration may enable a UE to repeat a RACH message or transmit a multi-slot RACH message across an SBFD slot and an uplink slot. The RACH configuration may map synchronization signal blocks (SSB)s to RACH occasions in the uplink subband of the SBFD slot. In some examples, the SSBs may be mapped across multiple (e.g., consecutive) SBFD slots. In some cases, the RACH configuration may enable a UE to repeat a RACH message or transmit a multi-slot RACH message across multiple SBFD slots.

30 Claims, 21 Drawing Sheets

(51) Int. Cl.
H04W 74/08 (2024.01)
H04W 74/0833 (2024.01)

(56) References Cited

U.S. PATENT DOCUMENTS

| | | | |
|---|---|---|---|
| 2023/0059505 A1* | 2/2023 | Yao | H04W 72/1268 |
| 2023/0180297 A1* | 6/2023 | Shin | H04W 52/146 |
| | | | 370/329 |
| 2023/0300755 A1* | 9/2023 | Shim | H04W 52/14 |
| | | | 455/522 |
| 2023/0422296 A1* | 12/2023 | Feng | H04W 74/02 |
| 2024/0389157 A1* | 11/2024 | Nhan | H04W 74/0833 |
| 2024/0407010 A1* | 12/2024 | Gou | H04W 72/0453 |
| 2025/0048441 A1* | 2/2025 | Wu | H04L 27/2656 |

* cited by examiner

PHYSICAL RANDOM ACCESS CHANNEL FOR UPLINK-SUBBAND IN SUBBAND FULL DUPLEX

FIELD OF TECHNOLOGY

The following relates to wireless communications, including physical random access channel for uplink-subband in subband full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support physical random access channel (PRACH) for uplink-subband in subband full duplex (SBFD). For example, the described techniques provide for transmission of a random access channel (RACH) message by a user equipment (UE) in an SBFD slot. A UE may receive control signaling that indicates a configuration for SBFD slots and a RACH configuration for SBFD slots. The UE may transmit at least one instance of a RACH message in an uplink subband of an SBFD slot in accordance with the indicated RACH configuration. In some cases, the RACH configuration may enable a UE to repeat a RACH message or transmit a multi-slot RACH message across an SBFD slot and an uplink slot (e.g., using the same or different frequency resources). The RACH configuration may map synchronization signal blocks (SSB)s to RACH occasions in the uplink subband of the SBFD slot. As there are fewer uplink frequency resources in an SBFD slot than an uplink slot, in some examples, fewer SSBs may be mapped to the SBFD slot. In some examples, the SSBs may be mapped across multiple (e.g., consecutive) SBFD slots. In some cases, the RACH configuration may enable a UE to repeat a RACH message or transmit a multi-slot RACH message across multiple SBFD slots.

A method for wireless communications at a user equipment (UE) is described. The method may include receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type and transmitting, to the network entity via a first uplink subband of a first slot of the SBFD slot type in accordance with the first RACH configuration, at least one instance of a RACH message via a first RACH occasion of the first set of RACH occasions.

An apparatus for wireless communications at a UE is described. The apparatus may include a processor, memory coupled with the processor, and instructions stored in the memory. The instructions may be executable by the processor to cause the apparatus to receive, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type and transmit, to the network entity via a first uplink subband of a first slot of the SBFD slot type in accordance with the first RACH configuration, at least one instance of a RACH message via a first RACH occasion of the first set of RACH occasions.

Another apparatus for wireless communications at a UE is described. The apparatus may include means for receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type and means for transmitting, to the network entity via a first uplink subband of a first slot of the SBFD slot type in accordance with the first RACH configuration, at least one instance of a RACH message via a first RACH occasion of the first set of RACH occasions.

A non-transitory computer-readable medium storing code for wireless communications at a UE is described. The code may include instructions executable by a processor to receive, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type and transmit, to the network entity via a first uplink subband of a first slot of the SBFD slot type in accordance with the first RACH configuration, at least one instance of a RACH message via a first RACH occasion of the first set of RACH occasions.

Some examples of the method, apparatuses, and non-transitory computer-readable medium described herein may further include operations, features, means, or instructions for transmitting, to the network entity via a second uplink subband of a second slot of the SBFD slot type in accordance with the first RACH configuration, a second instance of the RACH message via a second RACH occasion, where the second RACH occasion may be mapped to a same SSB of the first set of SSBs as the first RACH occasion.

In some examples of the method, apparatuses, and non-transitory computer-readable medium described herein, receiving the control signaling may include operations, features, means, or instructions for receiving the control signaling indicating the first RACH configuration indicating a quantity of symbols associated with the first set of RACH occasions, and where transmitting the at least one instance of the RACH message includes transmitting the at least one instance of the RACH message via the quantity of symbols, where transmitting the second instance of the RACH message includes transmitting the second instance via the quantity of symbols, and where a first position of the quantity of symbols in the first slot correspond to a second position of the quantity of symbols in the second slot.

In some examples of the method, apparatuses, and non-transitory computer-readable medium described herein, transmitting the at least one instance of the RACH message may include operations, features, means, or instructions for transmitting the at least one instance of the RACH message via the first slot and a second slot of the SBFD slot type, where the at least one instance of the RACH message is a single instance of the RACH message, where the first RACH occasion may be included within the first slot and the second slot.

Some examples of the method, apparatuses, and non-transitory computer-readable medium described herein may further include operations, features, means, or instructions for receiving, with the control signaling, an indication of a second RACH configuration associated with an uplink slot type, the second RACH configuration indicating a second mapping of a second set of SSBs including the first set of SSBs to a second set of RACH occasions.

Some examples of the method, apparatuses, and non-transitory computer-readable medium described herein may further include operations, features, means, or instructions for transmitting, to the network entity via an uplink slot of the uplink slot type in accordance with the second RACH configuration, a second instance of the RACH message via a second RACH occasion of the second set of RACH occasions, where the second RACH occasion may be mapped to a same SSB of the first set of SSBs as the first RACH occasion.

In some examples of the method, apparatuses, and non-transitory computer-readable medium described herein, the first RACH occasion includes a different set of frequency resources than the second RACH occasion.

In some examples of the method, apparatuses, and non-transitory computer-readable medium described herein, the first RACH occasion includes a same set of frequency resources as the second RACH occasion.

Some examples of the method, apparatuses, and non-transitory computer-readable medium described herein may further include operations, features, means, or instructions for transmitting the at least one instance of the RACH message via the first slot and an uplink slot of the uplink slot type, where the at least one instance of the RACH message is a single instance of the RACH message, where the first RACH occasion may be included within the first slot and the uplink slot.

In some examples of the method, apparatuses, and non-transitory computer-readable medium described herein, receiving the control signaling may include operations, features, means, or instructions for receiving the control signaling indicating the first RACH configuration mapping the first set of SSBs to the first set of RACH occasions across two or more slots of the SBFD slot type, where the first set of SSBs corresponds to the second set of SSBs, and where each of the second set of RACH occasions corresponds to one of the first set of RACH occasions.

In some examples of the method, apparatuses, and non-transitory computer-readable medium described herein, the first set of SSBs may be a subset of the second set of SSBs.

In some examples of the method, apparatuses, and non-transitory computer-readable medium described herein, receiving the control signaling may include operations, features, means, or instructions for receiving the control signaling indicating the first RACH configuration including a bitfield indicating the first set of SSBs.

In some examples of the method, apparatuses, and non-transitory computer-readable medium described herein, receiving the control signaling may include operations, features, means, or instructions for receiving the control signaling indicating the first RACH configuration mapping the first set of SSBs to RACH occasions within the first set of frequency resources and a remainder of the second set of SSBs to RACH occasions within the second set of frequency resources.

In some examples of the method, apparatuses, and non-transitory computer-readable medium described herein, receiving the control signaling may include operations, features, means, or instructions for receiving the control signaling indicating the first RACH configuration indicating a first quantity of symbols associated with the first set of RACH occasions and a second quantity of symbols associated with repetition for the first set of RACH occasions within a same slot, and where transmitting the at least one instance of the RACH message includes transmitting the at least one instance of the RACH message via the first quantity of symbols and transmitting a second instance of the RACH message via the first uplink subband of the first slot via the second quantity of symbols.

A method for wireless communications at a network entity is described. The method may include transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSB s to a first set of RACH occasions associated with the uplink subband of the SBFD slot type and receiving, from the UE via a first uplink subband of a first slot of the SBFD slot type in accordance with the first RACH configuration, at least one instance of a RACH message via a first RACH occasion of the first set of RACH occasions.

An apparatus for wireless communications at a network entity is described. The apparatus may include a processor, memory coupled with the processor, and instructions stored in the memory. The instructions may be executable by the processor to cause the apparatus to transmit, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSB s to a first set of RACH occasions associated with the uplink subband of the SBFD slot type and receive, from the UE via a first uplink subband of a first slot of the SBFD slot type in accordance with the first RACH configuration, at least one instance of a RACH message via a first RACH occasion of the first set of RACH occasions.

Another apparatus for wireless communications at a network entity is described. The apparatus may include means for transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type and means for receiving, from the UE via a first uplink subband of a first slot of the SBFD slot type in accordance with the first RACH configuration, at least one instance of a RACH message via a first RACH occasion of the first set of RACH occasions.

A non-transitory computer-readable medium storing code for wireless communications at a network entity is described. The code may include instructions executable by a processor to transmit, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type and receive, from the UE via a first uplink subband of a first slot of the SBFD slot type in accordance with the first RACH configuration, at least one instance of a RACH message via a first RACH occasion of the first set of RACH occasions.

Some examples of the method, apparatuses, and non-transitory computer-readable medium described herein may further include operations, features, means, or instructions for receiving, from the UE via a second uplink subband of a second slot of the SBFD slot type in accordance with the first RACH configuration, a second instance of the RACH message via a second RACH occasion, where the second RACH occasion may be mapped to a same SSB of the first set of SSBs as the first RACH occasion.

In some examples of the method, apparatuses, and non-transitory computer-readable medium described herein, transmitting the control signaling may include operations, features, means, or instructions for transmitting the control signaling indicating the first RACH configuration indicating a quantity of symbols associated with the first set of RACH occasions, and where receiving the at least one instance of the RACH message includes receiving the at least one instance of the RACH message via the quantity of symbols, where receiving the second instance of the RACH message includes receiving the second instance via the quantity of symbols, and where a first position of the quantity of symbols in the first slot correspond to a second position of the quantity of symbols in the second slot.

In some examples of the method, apparatuses, and non-transitory computer-readable medium described herein, receiving the at least one instance of the RACH message may include operations, features, means, or instructions for receiving the at least one instance of the RACH message via the first slot and a second slot of the SBFD slot type, where the at least one instance of the RACH message is a single instance of the RACH message, where the first RACH occasion may be included within the first slot and the second slot.

Some examples of the method, apparatuses, and non-transitory computer-readable medium described herein may further include operations, features, means, or instructions for transmitting, with the control signaling, an indication of a second RACH configuration associated with an uplink slot type, the second RACH configuration indicating a second mapping of a second set of SSBs including the first set of SSBs to a second set of RACH occasions.

Some examples of the method, apparatuses, and non-transitory computer-readable medium described herein may further include operations, features, means, or instructions for receiving, from the UE via an uplink slot of the uplink slot type in accordance with the second RACH configuration, a second instance of the RACH message via a second RACH occasion of the second set of RACH occasions, where the second RACH occasion may be mapped to a same SSB of the first set of SSBs as the first RACH occasion.

In some examples of the method, apparatuses, and non-transitory computer-readable medium described herein, the first RACH occasion includes a different set of frequency resources than the second RACH occasion.

In some examples of the method, apparatuses, and non-transitory computer-readable medium described herein, the first RACH occasion includes a same set of frequency resources as the second RACH occasion.

Some examples of the method, apparatuses, and non-transitory computer-readable medium described herein may further include operations, features, means, or instructions for receiving the at least one instance of the RACH message via the first slot and an uplink slot of the uplink slot type, where the at least one instance of the RACH message is a single instance of the RACH message, where the first RACH occasion may be included within the first slot and the uplink slot.

In some examples of the method, apparatuses, and non-transitory computer-readable medium described herein, transmitting the control signaling may include operations, features, means, or instructions for transmitting the control signaling indicating the first RACH configuration mapping the first set of SSBs to the first set of RACH occasions across two or more slots of the SBFD slot type, where the first set of SSBs corresponds to the second set of SSBs, and where each of the second set of RACH occasions corresponds to one of the first set of RACH occasions.

In some examples of the method, apparatuses, and non-transitory computer-readable medium described herein, the first set of SSBs may be a subset of the second set of SSBs.

In some examples of the method, apparatuses, and non-transitory computer-readable medium described herein, transmitting the control signaling may include operations, features, means, or instructions for transmitting the control signaling indicating the first RACH configuration including a bitfield indicating the first set of SSBs.

In some examples of the method, apparatuses, and non-transitory computer-readable medium described herein, transmitting the control signaling may include operations, features, means, or instructions for transmitting the control signaling indicating the first RACH configuration mapping the first set of SSBs to RACH occasions within the first set of frequency resources and a remainder of the second set of SSBs to RACH occasions within the second set of frequency resources.

In some examples of the method, apparatuses, and non-transitory computer-readable medium described herein, transmitting the control signaling may include operations, features, means, or instructions for transmitting the control signaling indicating the first RACH configuration indicating a first quantity of symbols associated with the first set of RACH occasions and a second quantity of symbols associated with repetition for the first set of RACH occasions within a same slot, and where receiving the at least one instance of the RACH message includes receiving the at least one instance of the RACH message via the first quantity of symbols and receiving a second instance of the RACH message via the first uplink subband of the first slot via the second quantity of symbols.

DETAILED DESCRIPTION

Figure 1:
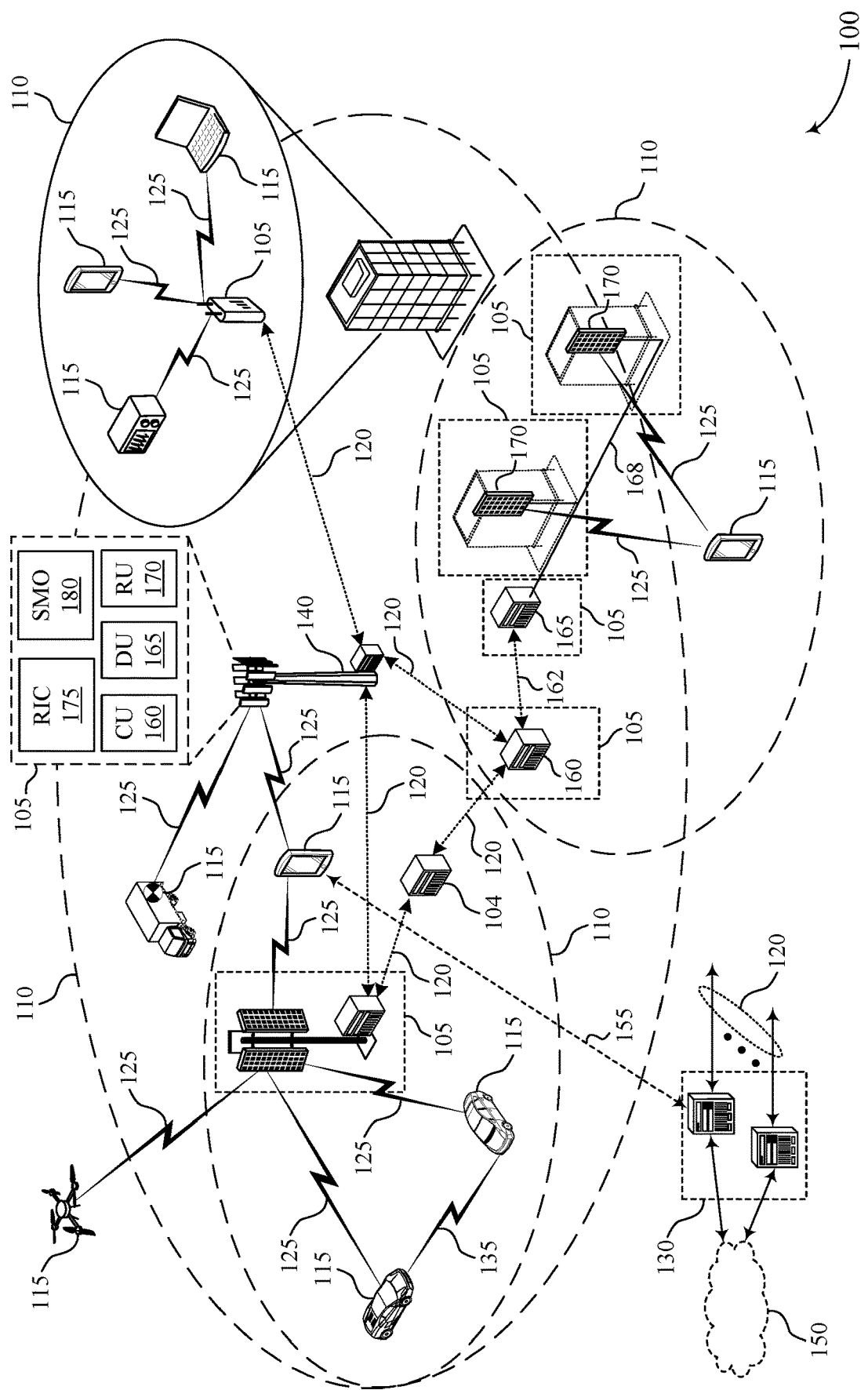
FIG. 1 illustrates an example of a wireless communications system that supports physical random access channel (PRACH) for uplink-subband in subband full duplex (SBFD) in accordance with one or more aspects of the present disclosure.

In some wireless communications systems, the network may implement a subband full duplex (SBFD) communication scheme, where a first set of frequency resources (which may include one or more non-contiguous subbands) may be used for communications in one direction (one of uplink or downlink), and a second set of frequency resources (which may include one or more non-contiguous subbands) may be used for communications in the other direction in a same time resource (e.g., the same slot or symbol). Some user equipments (UE)s may be aware that the network may operate in SBFD. A half duplex UE may transmit uplink communications or may receive downlink communications in a given time resource, but is not capable of transmitting and receiving simultaneously in the same time resource. An SBFD aware UE may transmit an uplink message in an uplink subband of an SBFD slot (which may be configured for the UE as a downlink slot).

A UE may perform a random access channel (RACH) procedure with the network, for example, to establish a radio resource control (RRC) connection with a network entity or for cell handover. To initiate a RACH procedure, a UE may transmit a msg-A in a 2-step RACH procedure or a msg-1 in a 4-step RACH procedure using a configured RACH occasion (which may be indicated in RRC signaling or broadcast system information such as a master information block (MIB) or a system information block (SIB)). The control signaling configuring RACH occasions may configure each RACH occasion with a synchronization signal block (SSB). Different RACH formats have may different durations (e.g., in a quantity of symbols or slots). Longer duration RACH messages may be used, for example, to increase coverage and/or accuracy. Similarly, in some cases, RACH messages may be repeated to increase accuracy. An SBFD aware UE may be unable to transmit RACH messages in the uplink subband of an SBFD slot absent receiving a RACH configuration from the network enabling the SBFD aware UE to transmit RACH messages in the uplink subband of an SBFD slot.

A UE may transmit a RACH message in an uplink subband of an SBFD slot in accordance with a RACH configuration indicated by the network for SBFD slots. The UE may receive control signaling (e.g., RRC signaling, a MIB, or a SIB) that indicates a configuration for SBFD slots and a RACH configuration for SBFD slots. The UE may transmit at least one instance of a RACH message in an uplink subband of an SBFD slot in accordance with the indicated RACH configuration. By enabling UEs to transmit RACH messages in SBFD slots, more resources may be available for RACH procedures, thereby decreasing the likelihood of collisions between RACH messages from multiple UEs. Additionally, by enabling UEs to transmit RACH messages in SBFD slots, more resources are available for RACH repetition and/or longer duration RACHs, thereby increasing initial access accuracy and coverage. In some cases, the RACH configuration may enable a UE to repeat a RACH message or transmit a multi-slot RACH message across an SBFD slot and an uplink slot (e.g., using the same or different frequency resources). The RACH configuration may map SSBs to RACH occasions in the uplink subband of the SBFD slot. As there are less uplink frequency resources in an SBFD slot than an uplink slot, in some examples, fewer SSBs may be mapped to the SBFD slot. In some examples, the SSBs may be mapped across multiple (e.g., consecutive) SBFD slots. In some cases, the RACH configuration may enable a UE to repeat a RACH message or transmit a multi-slot RACH message across multiple SBFD slots.

Aspects of the disclosure are initially described in the context of wireless communications systems. Aspects of the disclosure are further illustrated by and described with reference to resource diagrams and process flows. Aspects of the disclosure are further illustrated by and described with reference to apparatus diagrams, system diagrams, and flowcharts that relate to physical RACH (PRACH) for uplink-subband in SBFD.

FIG. 1 illustrates an example of a wireless communications system 100 that supports PRACH for uplink-subband in SBFD in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support PRACH for uplink-subband in SBFD as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/$ ($\Delta f_{max} \cdot N_f$) seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network entity 105 may implement an SBFD communication scheme, where a first set of frequency resources (which may include one or more non-contiguous subbands) may be used for communications in one direction (one of uplink or downlink), and a second set of frequency resources (which may include one or more non-contiguous subbands) may be used for communications in the other direction in a same time resource (e.g., the same slot or symbol). Some UEs 115 may be aware that the network may operate in SBFD. A half duplex UE 115 may transmit uplink communications or may receive downlink communications in a given time resource, but is not capable of transmitting and receiving simultaneously in the same time resource. An SBFD aware UE 115 may transmit an uplink message in an uplink subband of an SBFD slot (which may be configured for the UE 115 as a downlink slot).

A UE 115 may perform a RACH procedure with the network entity 105, for example, to establish an RRC connection with the network entity 105 or for cell handover. To initiate a RACH procedure, a UE 115 may transmit a msg-A in a 2-step RACH procedure or a msg-1 in a 4-step RACH procedure using a configured RACH occasion (which may be indicated in RRC signaling or broadcast system information such as a MIB or a SIB). The control signaling configuring RACH occasions may configure each RACH occasion with a particular SSB. Different RACH formats have may different durations (e.g., in a quantity of symbols or slots). Longer duration RACH messages may be used, for example, to increase coverage and/or accuracy. Similarly, in some cases, RACH messages may be repeated to increase accuracy. An SBFD aware UE 115 may be unable to transmit RACH messages in the uplink subband of an SBFD slot absent receiving a RACH configuration from the network enabling the SBFD UE 115 to transmit RACH messages in the uplink subband of an SBFD slot.

A UE 115 may transmit a RACH message in an uplink subband of an SBFD slot in accordance with a RACH configuration indicated by the network for SBFD slots. The UE 115 may receive control signaling (e.g., RRC signaling, a MIB, or a SIB) that indicates a configuration for SBFD slots and a RACH configuration for SBFD slots. The UE 115 may transmit at least one instance of a RACH message in an uplink subband of an SBFD slot in accordance with the indicated RACH configuration. By enabling UEs 115 to transmit RACH messages in SBFD slots, more resources may be available for RACH procedures, thereby decreasing the likelihood of collisions between RACH messages from multiple UEs 115. Additionally, by enabling UEs 115 to transmit RACH messages in SBFD slots, more resources are available for RACH repetition and/or longer duration RACHs, thereby increasing initial access accuracy and coverage. In some cases, the RACH configuration may enable a UE 115 to repeat a RACH message or transmit a multi-slot RACH message across an SBFD slot and an uplink slot (e.g., using the same or different frequency resources). The RACH configuration may map SSBs to RACH occasions in the uplink subband of the SBFD slot. As there are less uplink frequency resources in an SBFD slot than an uplink slot, in some examples, fewer SSBs may be mapped to the SBFD slot. In some examples, the SSBs may be mapped across multiple (e.g., consecutive) SBFD slots. In some cases, the RACH configuration may enable a UE to repeat a RACH message or transmit a multi-slot RACH message across multiple SBFD slots.

Figure 2:
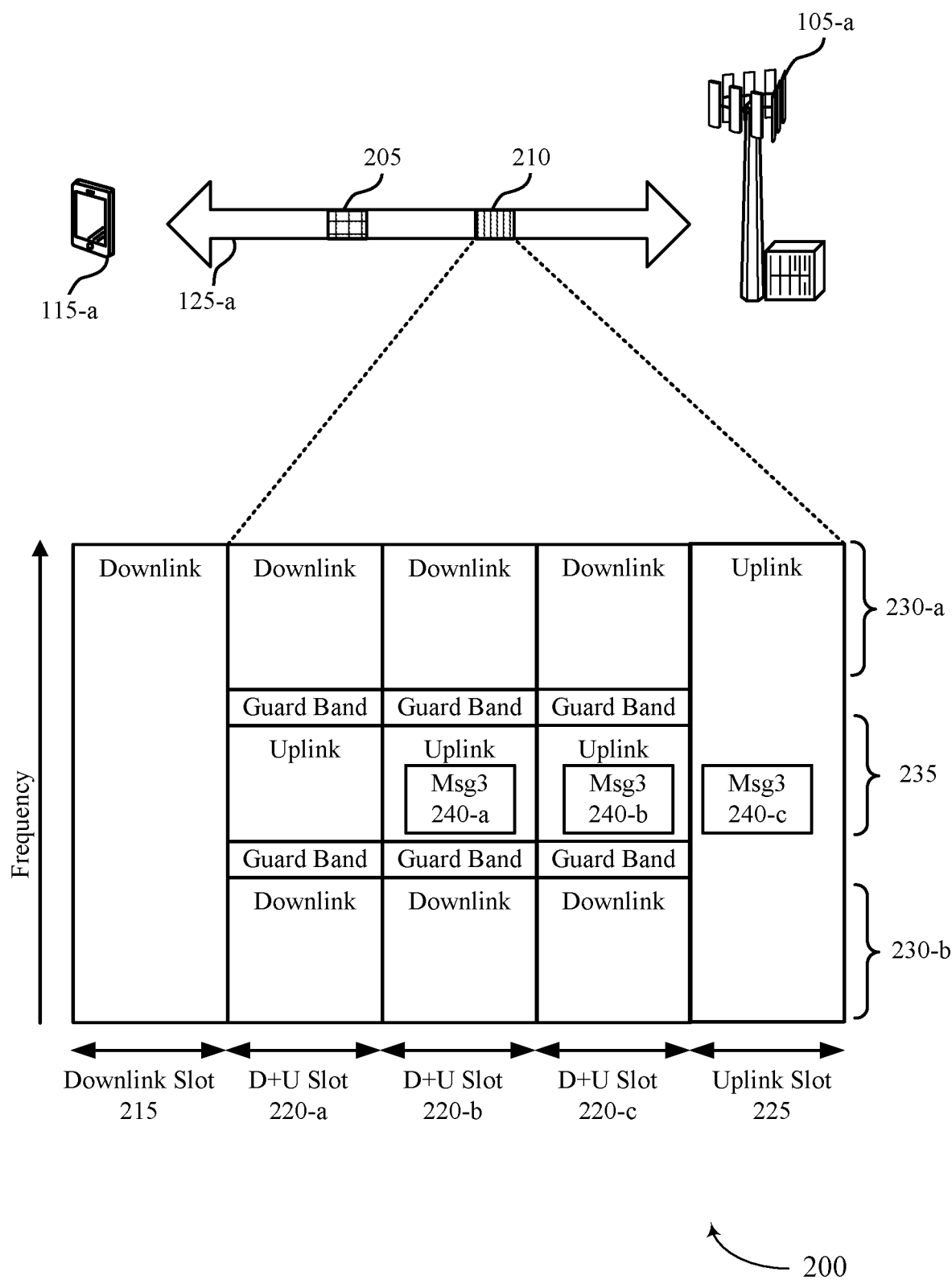
FIG. 2 illustrates an example of a wireless communications system that supports PRACH for uplink-subband in SBFD in accordance with one or more aspects of the present disclosure.

FIG. 2 illustrates an example of a wireless communications system 200 that supports PRACH for uplink-subband in SBFD in accordance with one or more aspects of the present disclosure. The wireless communications system 200 may implement aspects of the wireless communications system 100. For example, the wireless communications system 200 may include a UE 115-a, which may be an example of a UE 115 as described herein. The wireless communications system 200 a may include a network entity 105-a, which may be an example of a network entity 105 as described herein.

The UE 115-a may communicate with the network entity 105-a using a communication link 125-a. The communication link 125-a may be an example of an NR or LTE link between the UE 115-a and the network entity 105-a. The communication link 125-a may include bi-directional links that enable both the uplink and downlink communication. For example, the UE 115-a may transmit uplink signals (e.g., uplink transmissions), such as uplink control signals or uplink data signals, to the network entity 105-a using the communication link 125-a and the network entity 105-a may transmit downlink signals (e.g., downlink transmissions), such as downlink control signals or downlink data signals, to the UE 115-a using the communication link 125-a.

The UE 115-a may perform a random access procedure with the network entity 105-a in accordance with a RACH configuration indicated in control signaling 205. In a type-1 random access procedure, the UE 115-a may be provided a number N of synchronization signal (SS) or physical broadcast channel (PBCH) indexes associated with one PRACH occasion and a number R of contention based preambles per SS/PBCH block index per valid PRACH occasion by the RRC information element (IE) ssb-perRACH-OccasionAndCB-PrernablesPerSSB. For a type-1 random access procedure, or for a type-2 random access procedure with a separate configuration of PRACH occasions from a type-1 random access procedure, if N<1, one SS/PBCH block index may be mapped to 1/N consecutive valid PRACH occasions and R contention based preambles with consecutive indexes associated with the SS/PBCH block index per valid PRACH occasion start from preamble index 0. If N≥1, R contention based preambles with consecutive indexes associated with SS/PBCH block index n, 0≤n≤N−1, per valid PRACH occasion start from preamble index $n \cdot N_{preamble}^{total}/N$ where $N_{preamble}^{total}$ is provided by the RRC IE totalNumberOfRAPreambles for Type-1 random access procedure.

SS/PBCH block indexes provided by the IE ssb-PositionsInBurst in SIB1 or in the RRC IE ServingCellConfigCommon may be mapped to valid PRACH occasions in the following order: (1) First, in increasing order of preamble indexes within a single PRACH occasion; (2) Second, in increasing order of frequency resource indexes for frequency multiplexed PRACH occasions; (3) Third, in increasing order of time resource indexes for time multiplexed PRACH occasions within a PRACH slot; and (4) Fourth, in increasing order of indexes for PRACH slots.

An association period, starting from frame 0, for mapping SS/PBCH block indexes to PRACH occasions is the smallest value in the set determined by the PRACH configuration period according to Table 1 such that $N_{Tx}^{SSB}$ SS/PBCH block indexes are mapped at least once to the PRACH occasions within the association period, where a UE 115 obtains $N_{Tx}^{SSB}$ from the value of ssb-PositionsInBurst in SIB1 or in ServingCellConfigCommon. If after an integer number of SS/PBCH block indexes to PRACH occasions mapping cycles within the association period there is a set of PRACH occasions or PRACH preambles that are not mapped to $N_{Tx}^{SSB}$ SS/PBCH block indexes, no SS/PBCH block indexes are mapped to the set of PRACH occasions or PRACH preambles. An association pattern period may include one or more association periods and may be determined so that a pattern between PRACH occasions and SS/PBCH block indexes repeats at most every 160 msec. PRACH occasions not associated with SS/PBCH block indexes after an integer number of association periods, if any, may not be used for PRACH transmissions. For example, an SSB may be invalid for the UE 115 if insufficient PRACH occasions are available for the SSB in the association period.

TABLE 1

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

The network entity 105-a may operate in an SBFD mode (e.g., some slots, such as the SBFD slot 220-a, the SBFD slot 220-b, and the SBFD slot 220-c may be SBFD slots). In an SBFD slot, the network entity 105-a may simultaneously transmit downlink signals via one or more downlink subbands (e.g., the downlink subband 230-a and the downlink subband 230-b) and receive uplink signals via one or more uplink subbands (e.g., an uplink subband 235). Guard bands may separate the uplink and downlink subbands in an SBFD slot. The network entity 105-a may also transmit downlink signals via downlink slots 215 and may receive uplink signals via uplink slots 225.

In some aspects, SBFD operation at the network entity 105-a may be transparent to the UE 115-a (e.g., the time and frequency locations of subbands for SBFD operation may not be known to a UE 115-a). In some aspects, SBFD may be non-transparent to the UE 115-a. For example, the UE 115-a may be a half duplex UE that may be aware that the network entity 105-a may operate in SBFD. In some aspects, only the time locations of subbands for SBFD operation may be known to the UE 115-a. In some aspects, both the time and frequency locations of subbands for SBFD operation may be known to the UE 115-a. For example, the network entity 105-a may indicate the uplink/downlink subbands configuration (e.g., frequency resources assigned to the uplink subband 235 and the downlink subband 230-a and/or the downlink subband 230-b) to the UE 115-a via control signaling 205 (e.g., RRC signaling). The control signaling 205 may also indicate which slots are uplink slots, which slots are downlink, and which slots are SBFD slots.

In some examples, the uplink/downlink subband configuration for SBFD slots may be indicated to the UE 115-a where the UE 115-a is in an RRC idle or RRC inactive mode. For example, within an initial access procedure, the UE 115-a may utilize the uplink subband 235 to enable a msg1 of a 4 step-RACH, a msgA of a 2-step RACH, or msg3 repetition for a 4 step RACH and/or frequency hopping. For example, a RACH message 210 such as an msg3 may be repeated by the UE 115-a in the SBFD slot 220-b, the SBFD slot 220-c, and the uplink slot 225 (shown as the msg3 240-a, the msg3 240-b, and the msg3 240-c, respectively) Indication of the uplink/downlink subband configuration for SBFD when the UE 115-a is in an RRC idle mode may also enable additional RACH occasions (RO)s within the uplink subband 235 (where an SBFD slot such as the SBFD slot 220-a, the SBFD slot 220-b, or the SBFD slot 220-c, may typically be considered by the UE 115-a as downlink slot) outside of uplink slots 225, thereby reducing collisions and enabling more UEs 115 to access the network. Indication of the uplink/downlink subband configuration for SBFD when the UE 115-a is in an RRC idle mode may also reduce latency for random access procedures and potentially for initial access and handover, for example when layer 1 or layer 2 mobility is adopted.

Accordingly, a RACH configuration indicated in control signaling 205 may enable the UE 115-a to utilize the uplink subbands within SBFD slots (e.g., with back-to-back uplink subbands or consecutive with an uplink slot) to improve PRACH coverage (e.g., via repetition or longer PRACH messages). The RACH configuration indicated in control signaling 205 may enable the UE 115-a to determine the valid ROs in the uplink subband 235 of the SBFD slots and to determine how SSBs are mapped to ROs. The RACH configuration for SBFD slots may be indicated via control signaling to the UE 115-a if the UE 115-a is in an RRC idle mode (e.g., for initial access) or if the UE 115-a is in an RRC connected mode (e.g., for contention based random access (CBRA) or contention free random access (CFRA)). The UE 115-a may be an SBFD-aware UE or an SBFD capable UE.

Figure 3:
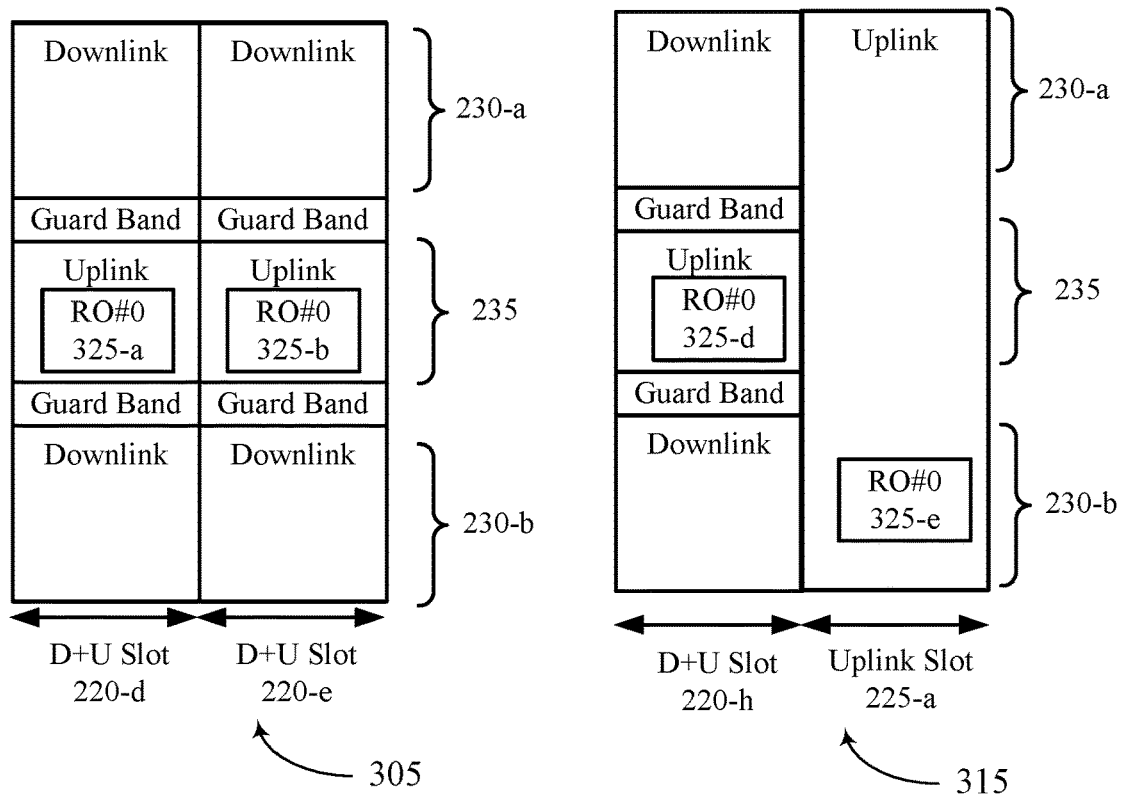
FIG. 3 illustrates an example of a resource diagram that supports PRACH for uplink-subband in SBFD in accordance with one or more aspects of the present disclosure.
Figure 3:
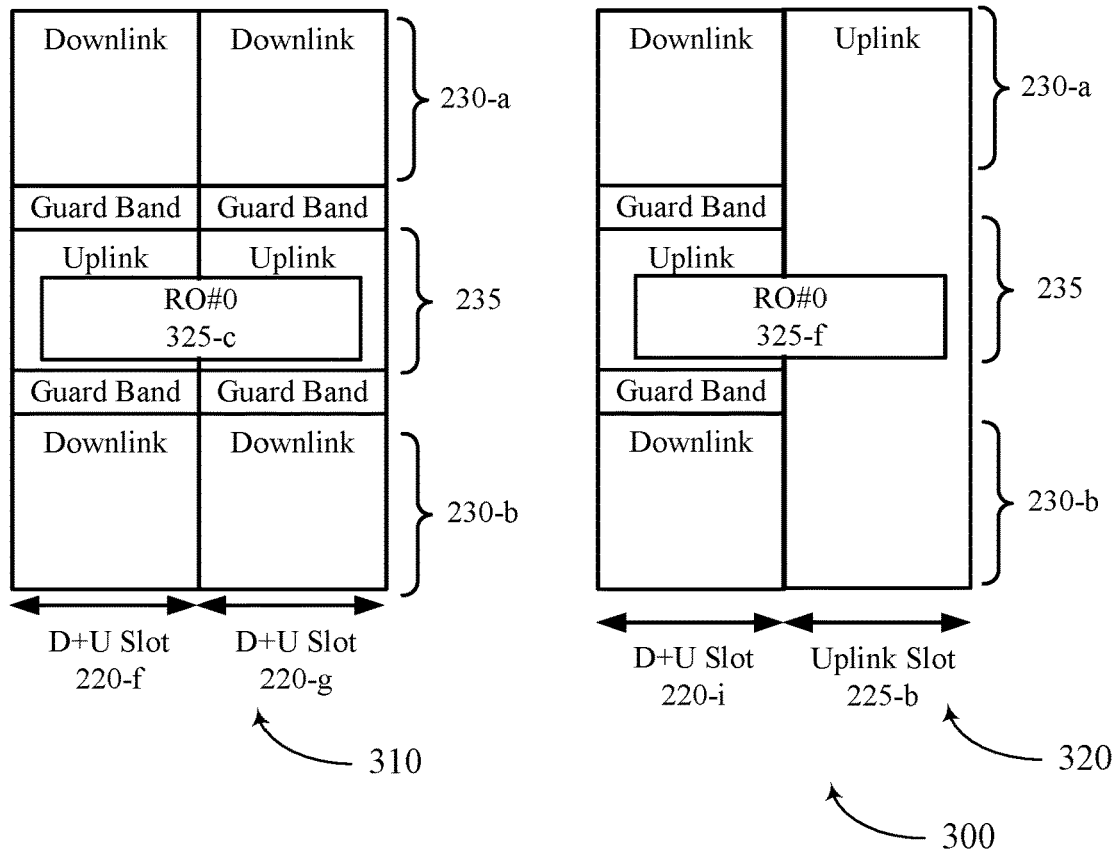

FIG. 3 illustrates an example of a resource diagram 300 that supports PRACH for uplink-subband in SBFD in accordance with one or more aspects of the present disclosure. The resource diagram 300 may implement aspects of the wireless communications system 100 or the wireless communications system 200.

Introducing ROs into the uplink subband 235 of SBFD slots (e.g., the first SBFD slot 220-d and the second SBFD slot 220-e in the example 305, the first SBFD slot 220-f and the second SBFD slot 220-g in the example 310, the SBFD slot 220-h in the example 315, and the SBFD slot 220-i in the example 320) may enable PRACH repetition, especially for short PRACH format sequences. Introducing ROs into the uplink subband 235 of SBFD slots may also enable a long PRACH format across multiple slots.

The example 305 of the resource diagram shows an example where a RACH message may be repeated in the corresponding ROs across multiple SBFD slots (e.g., the same indexed ROs). For example, a RACH message may be repeated in the RO 325-a in the first SBFD slot 220-d and the RO 325-b in the second SBFD slot 220-e (e.g., a first instance of the RACH message may be transmitted in the RO 325-a and a second instance of the RACH message may be transmitted in the RO 325-b). The example 310 shows an example where a long duration RACH message may be transmitted in an RO 325-c that spans multiple SBFD slots (the first SBFD slot 220-f and the second SBFD slot 220-g). In other words, a single instance of a RACH message may be transmitted across the SBFD slot 220-f and the SBFD slot 220-g. The example 315 shows an example where a RACH message may be repeated in the same ROs across an SBFD slot 220-h and an uplink slot 225-a (e.g., a first instance of the RACH message may be transmitted in the RO 325-d and a second instance of the RACH message may be transmitted in the RO 325-e). As shown, in some examples, the frequency resources of a corresponding RO in an SBFD slot 220-h (e.g., the RO 325-d) and an uplink slot 225-a (e.g., the RO 325-e) may be different. The example 320 shows an example where a long duration RACH message may be transmitted in an RO 325-f that spans an SBFD slot 220-i and an uplink slot 225-b. In other words, a single instance of a RACH message may be transmitted across the SBFD slot 220-i and the uplink slot 225-b. For example, the RACH messages transmitted in the RO 325-c or the RO 325-f may be a PRACH index of a long format 0, 1, 2, or 3. In some examples, a network entity 105 may transmit, to a UE 115, a control signal to indicate which one or more RACH configurations to apply for SBFD and uplink slots. The UE 115 may operate in accordance with the indicated one or more RACH configurations to, for example, repeat RACH message in consecutive slots or transmit a long RACH message that spans multiple slots.

Figure 4:
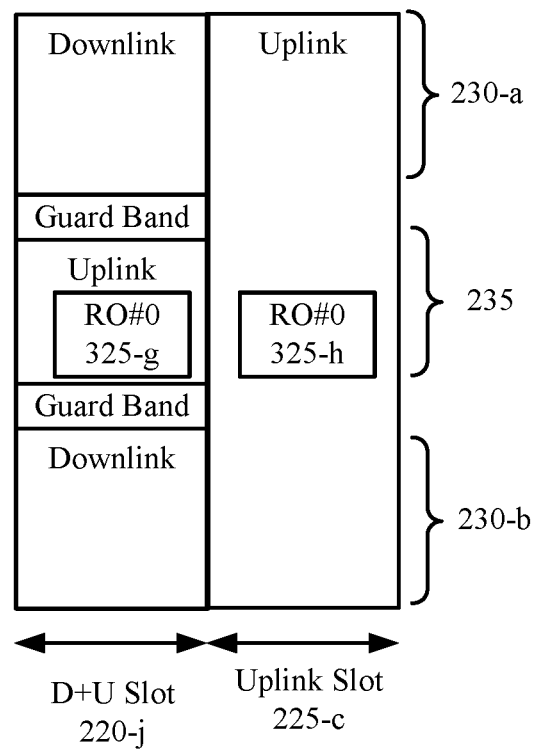
FIG. 4 illustrates an example of a resource diagram that supports PRACH for uplink-subband in SBFD in accordance with one or more aspects of the present disclosure.

FIG. 4 illustrates an example of a resource diagram 400 that supports PRACH for uplink-subband in SBFD in accordance with one or more aspects of the present disclosure. The resource diagram 400 may implement aspects of the wireless communications system 100 or the wireless communications system 200.

As described herein, for example, with respect to the example 315 of FIG. 3, a UE 115 may repeat a RACH message in the corresponding ROs across an SBFD slot consecutive with an uplink slot. The network entity 105 may indicate two separate RACH configurations for SBFD slots and uplink slots, and may associate ROs with the same RO index within the same SFN and subframe number across the SBFD and uplink slots. In some examples, for example as shown in the example 315 of FIG. 3, the associated ROs may not start from the same resource block (RB) offset (e.g., may have different frequency resources). If the associated ROs have different frequency resources in SBFD and uplink slots, the UE 115 may apply frequency hopping when repeating a RACH message across an SBFD slot and uplink slot, which may provide frequency diversity. In some examples, as shown in the resource diagram 400, the associated ROs (e.g., the RO 325-g in the SBFD slot 220-j and the RO 325-h in the uplink slot 225-c) may start from the same RB offset (e.g., may have the same frequency resources).

Figure 5:
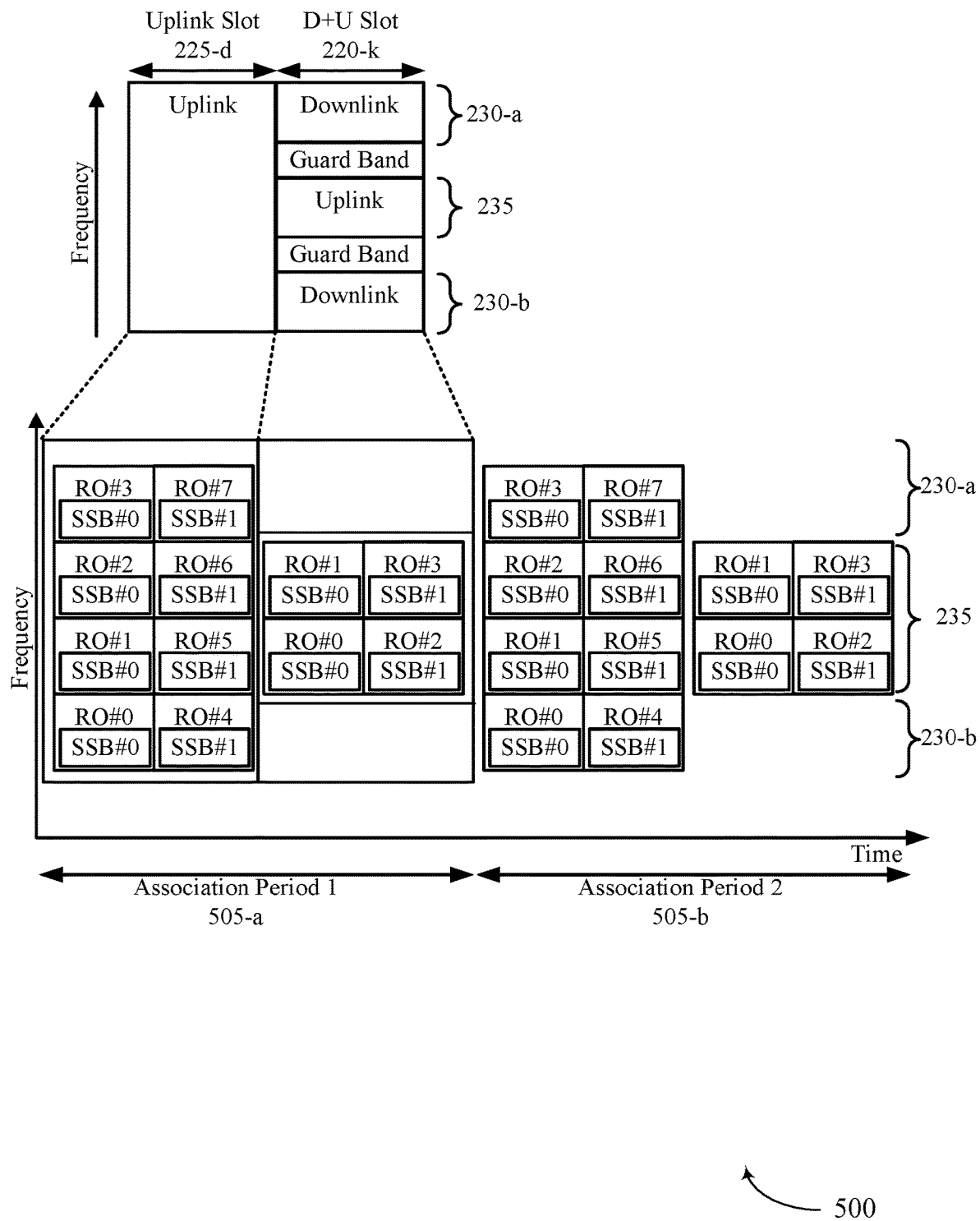
FIG. 5 illustrates an example of a resource diagram that supports PRACH for uplink-subband in SBFD in accordance with one or more aspects of the present disclosure.

FIG. 5 illustrates an example of a resource diagram 500 that supports PRACH for uplink-subband in SBFD in accordance with one or more aspects of the present disclosure. The resource diagram 500 may implement aspects of the wireless communications system 100 or the wireless communications system 200.

Control signaling may indicate to a UE 115 different RACH configurations for uplink slots 225-d and SBFD slots 220-k. For example, as there are less uplink frequency resources in an SBFD slot 220-k than an uplink slot 225-d, there may be fewer ROs in an SBFD slot 220-k than an uplink slot 225-d. For example, as shown, in the uplink slot 225-d: N=¼, msg1-FDM=4, and $N_{Tx}^{SSB}$=2; and in the SBFD slot: N=½, msg1-FDM=2, and $N_{Tx}^{SSB}$=2. Accordingly, if 8 ROs are available in the uplink slot 225-d for the first association period 505-a and the second association period 505-b, and two SSBs (SSB #0 and SSB #1) are each mapped to four ROs in the uplink slot 225-d, and if 4 ROs are available in the SBFD slot 220-k, then each of the two SSBs may be mapped to two ROs in the SBFD slot 220-k.

Figure 6:
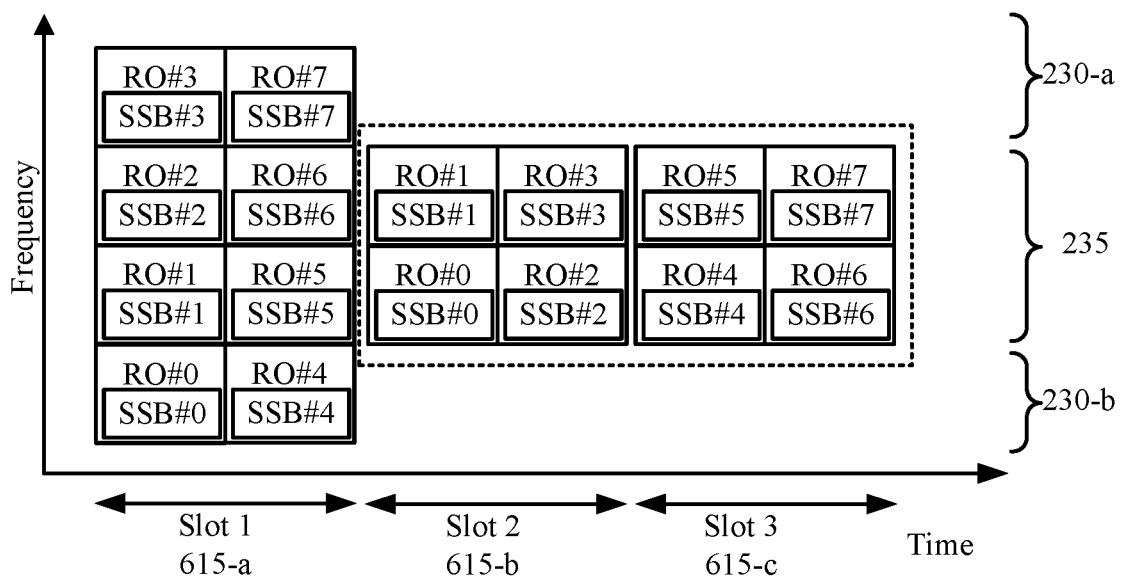
FIG. 6 illustrates an example of a resource diagram that supports PRACH for uplink-subband in SBFD in accordance with one or more aspects of the present disclosure.
Figure 6:
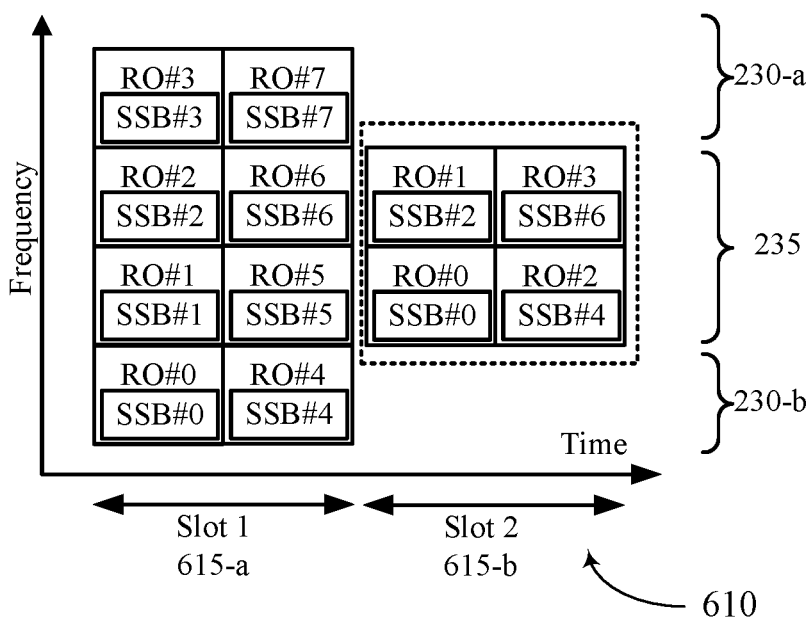

FIG. 6 illustrates an example of a resource diagram 600 that supports PRACH for uplink-subband in SBFD in accordance with one or more aspects of the present disclosure. The resource diagram 600 may implement aspects of the wireless communications system 100 or the wireless communications system 200.

As described herein, control signaling may indicate to a UE 115 different RACH configurations for uplink slots (e.g., an uplink slot 615-a) and SBFD slots (e.g., an SBFD slot 615-b and/or an SBFD slot 615-c). Whether ROs are repeated across SBFD and uplink slots may be a design criteria which may be indicated to a UE 115 by control signaling. For example, some SSBs may not be mapped to ROs within the uplink subband 235 of an SBFD slot, as there may be little demand for repetition for those SSBs (e.g., if an SSB is not overloaded). Some SSBs, however, such as SSBs for cell edge UEs or some coverage-critical direction may be prioritized for PRACH repetition.

The first example 605 of the resource diagram 600 illustrates a design of ROs where PRACH repetitions may be applied to all ROs of all SSBs. In the first example, the mapping between SSBs and ROs may be different for uplink slots (e.g., an uplink slot 615-a) and SBFD slots (e.g., the SBFD slot 615-b and/or the SBFD slot 615-c) to compensate the limited frequency band within the uplink subband 235 as compared to the frequency band of the uplink slot 615-a. For example, in the uplink slot 615-a: N=1, msg1-FDM=4, and $N_{Tx}^{SSB}$=8; and in each SBFD slot: N=1, msg1-FDM=2, $N_{Tx}^{SSB}$=8. For example, eight SSBs may be mapped to eight ROs in the uplink slot 615-a. Each of the next two SBFD slots (e.g., the SBFD slot 615-b and the SBFD slot 615-c) may include four ROs, and the eight SSBs may be mapped to the eight ROs across the two SBFD slots (e.g., the SBFD slot 615-b and the SBFD slot 615-c). In some examples, the ROs in an uplink slot 615-a may be mapped across more than two SBFD slots.

The second example 610 of the resource diagram 600 illustrates a design of ROs where PRACH repetition is available to specific ROs. For example, in the uplink slot 615-a: N=1, msg1-FDM=4, and $N_{Tx}^{SSB}$=8; and in the SBFD 615-b: slot N=1, msg1-FDM=2, $N_{Tx}^{SSB}$=4. For example, there may be two classes of SSBs, one associated with ROs in both the uplink subband of SBFD slots (e.g., the SBFD slot 615-b) and uplink slots 615-a, and other SSBs associated with ROs only in the uplink slots 615-a. For example, the even indexed SSBs (SSB #0, SSB #2, SSB #4, and SSB #6) may be associated with ROs in both the uplink subband of SBFD slots (e.g., the SBFD slot 615-b) and uplink slots 615-a, and the odd indexed SSBs (SSB #1, SSB #3, SSb #5, and SSB #7) may be associated with ROs only in the uplink slots 615-a. ROs in both the uplink subband of SBFD slots (e.g., the SBFD slot 615-b) and uplink slots 615-a may be used for repetition or longer duration RACH messages (e.g., to improve accuracy or coverage area), and ROs only in the uplink slots 615-a may be used for SSBs that are not overloaded or for UEs 115 in closer proximity to the network entity 105. Control signaling may indicate to the UE 115 which SSBs are mapped to the uplink subband 235 of the SBFD slots.

Figure 7:
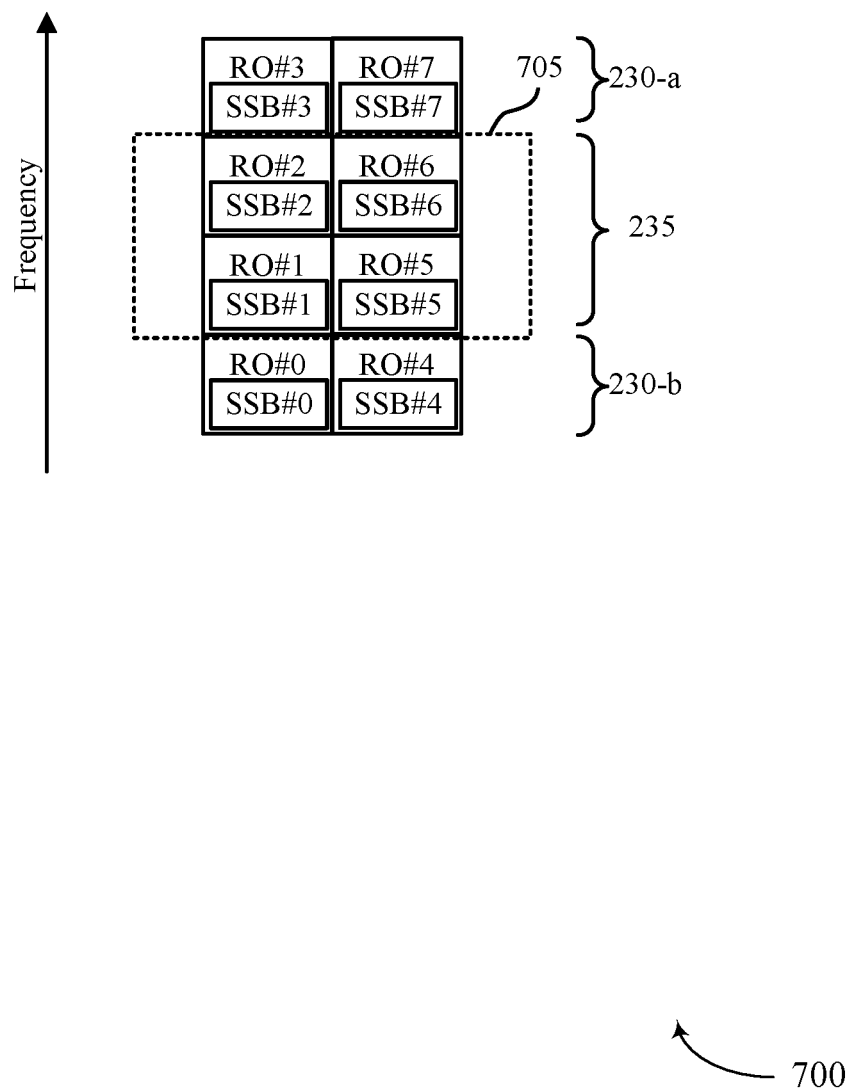
FIG. 7 illustrates an example of a resource diagram that supports PRACH for uplink-subband in SBFD in accordance with one or more aspects of the present disclosure.

FIG. 7 illustrates an example of a resource diagram 700 that supports PRACH for uplink-subband in SBFD in accordance with one or more aspects of the present disclosure. The resource diagram 700 may implement aspects of the wireless communications system 100 or the wireless communications system 200.

As described herein, in some cases, there may be two classes of SSBs, one associated with ROs in both the uplink subband of SBFD slots and uplink slots, and other SSBs associated with ROs only in the uplink slots. In such cases, mapping rules may define to the UE 115 which SSB(s) are mapped to ROs 705 in the uplink subband 235 of SBFD slots.

In some examples, control signaling (e.g., RRC signaling, a MIB, or a SIB) may include an SSB index bitfield that indicates which SSBs will be mapped to ROs in the uplink subband 235 of SBFD slots. For example, the SSB index bitfield may indicate $N_{SSB}^{Tx}$ to the UE 115. For example, the SSB index bitfield may indicate SSB #1, SSB #2, SSB #5, and SSB #6 are mapped to ROs in the uplink subband 235 of SBFD slots.

In some examples, the control signaling may use the same mapping rules as for uplink slots, and the UE 115 may determine that ROs within the downlink subbands of the SBFD slots (e.g., the downlink subband 230-a and the downlink subband 230-b) are invalid. For example, the UE 115 may determine that SSB #1, SSB #2, SSB #5, and SSB #6, which are within the uplink subband 235 are valid, and the SSB #0, the SSB #3, the SSB #4, and the SSB #7 within the downlink subband 230-a and the downlink subband 230-b are invalid.

Figure 8:
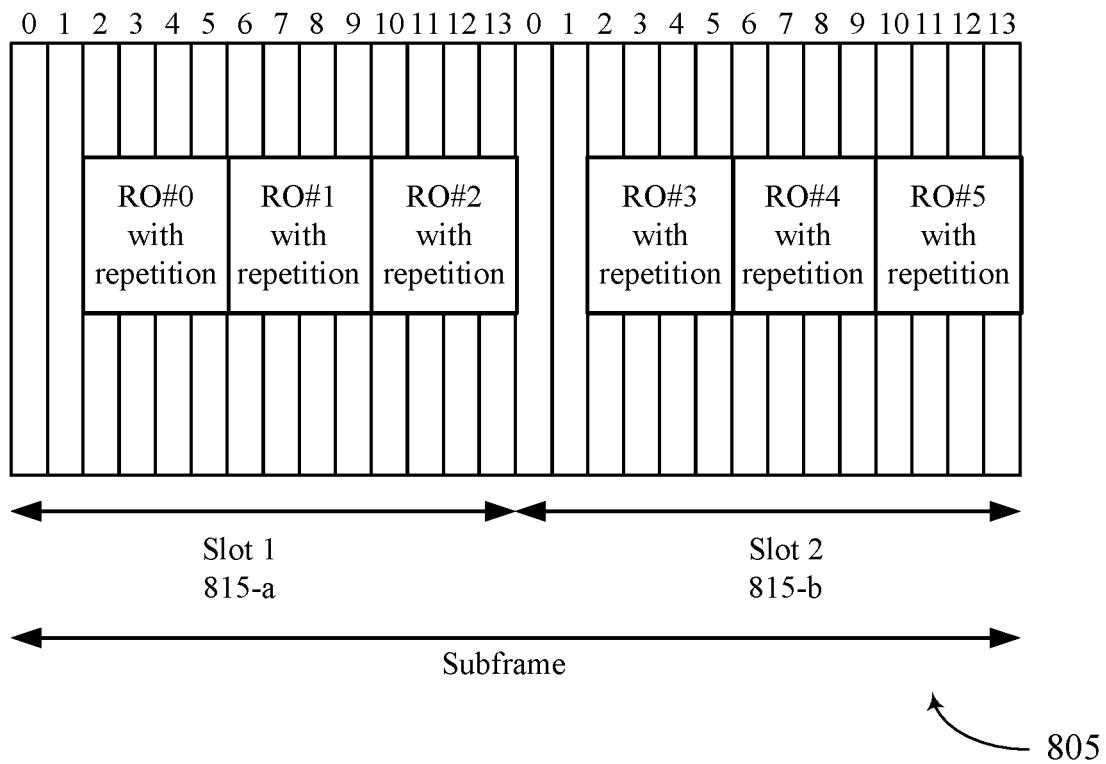
FIG. 8 illustrates an example of a resource diagram that supports PRACH for uplink-subband in SBFD in accordance with one or more aspects of the present disclosure.
Figure 8:
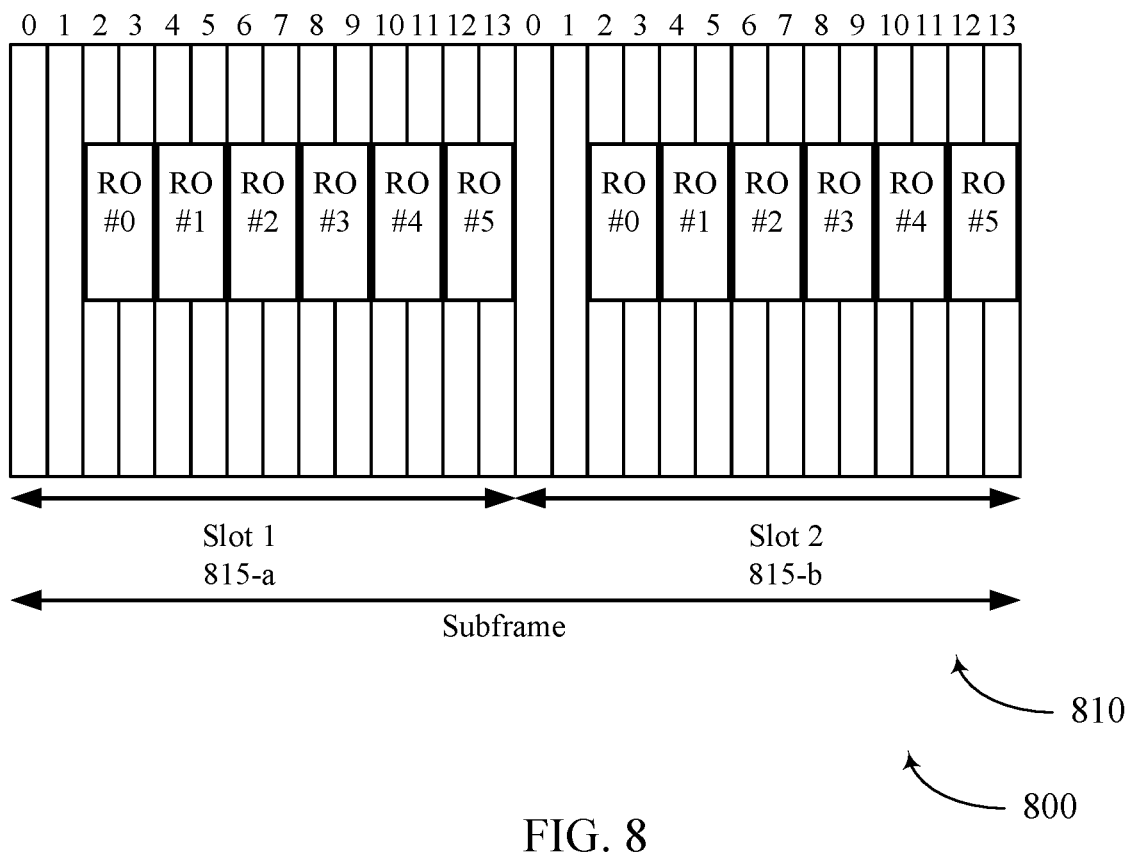

FIG. 8 illustrates an example of a resource diagram 800 that supports PRACH for uplink-subband in SBFD in accordance with one or more aspects of the present disclosure. The resource diagram 800 may implement aspects of the wireless communications system 100 or the wireless communications system 200.

In some examples, ROs may be defined to enable PRACH repetition within two consecutive SBFD slots (a first SBFD slot 815-a and a second SBFD slot 815-b) for SBFD aware UEs 115 or to extend the duration of the RO to enable repetition within the symbols of the RO. For example, the first example 805 of the resource diagram 800 shows a design where durations of ROs may be extended to enable PRACH repetition within a RO, and ROs may be mapped across the two consecutive SBFD slots (the first SBFD slot 815-a and the second SBFD slot 815-b). The second example 810 of the resource diagram 800 shows a design where ROs are repeated in corresponding symbol positions across the two consecutive SBFD slots (the first SBFD slot 815-a and the second SBFD slot 815-b) to enable PRACH repetition across the two consecutive SBFD slots. In such a design, two ROs across two slots may be associated for repetition. As the designs shown in the first example 805 and the second example 810 are for SBFD aware UEs 115, PRACH messages transmitted in the ROs are not multiplexed with PRACH messages from non-SBFD aware UEs, and accordingly the RO counting in SBFD slots may be defined specifically for SBFD aware UEs 115 in consecutive SBFD slots. The examples shown in FIG. 8 show two repetitions, however, designs may be extended to enable more than two repetitions across multiple slots. For example, the duration of an RO may be extended to enable ($N_{PRACH}^{rep}$) PRACH repetitions.

For example, control signaling may indicate to an SBFD aware UE 115 the number of ROs within each SBFD slot, the symbol positions of each RO (e.g., the starting symbol), a duration in symbols of each RO, a number of repetitions of each RO, and whether the RO is repeated in consecutive symbols within the same slot (e.g., as shown in the first example 805) or in a next consecutive slot (e.g., as shown in the second example 810). If the ROs are repeated across consecutive SBFD slots (e.g., as shown in the second example 810), corresponding ROs may be repeated in the corresponding symbol positions of the SBFD slots. For example, RO #0 may be in the second and third symbols of the first SBFD slot 815-a and the second SBFD slot 815-b, RO #2 be in the fourth and fifth symbols of the first SBFD slot 815-a and the second SBFD slot 815-b, RO #3 be in the sixth and seventh symbols of the first SBFD slot 815-a and the second SBFD slot 815-b, and so on.

Figure 9:
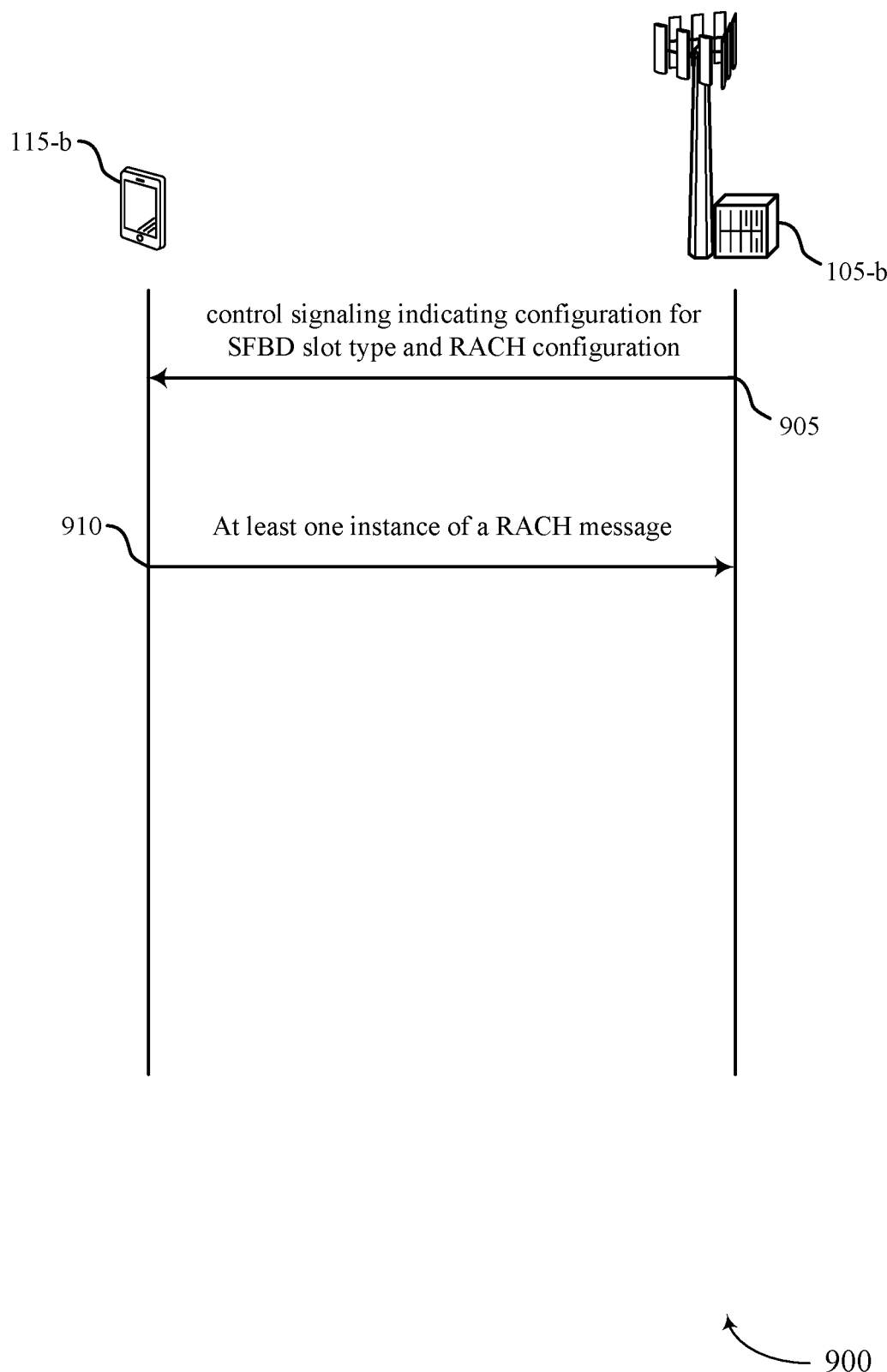
FIG. 9 illustrates an example of a process flow that supports PRACH for uplink-subband in SBFD in accordance with one or more aspects of the present disclosure.

FIG. 9 illustrates an example of a process flow 900 that supports PRACH for uplink-subband in SBFD in accordance with one or more aspects of the present disclosure.

The process flow 900 may include a UE 115-b, which may be an example of a UE 115 as described herein. The process flow 900 may include a network entity 105-b, which may be an example of a network entity 105 as described herein. In the following description of the process flow 900, the operations between the network entity 105-b and the UE 115-b may be transmitted in a different order than the example order shown, or the operations performed by the network entity 105-b and the UE 115-b may be performed in different orders or at different times. Some operations may also be omitted from the process flow 900, and other operations may be added to the process flow 900.

At 905, the UE 115-b may receive, from the network entity 105-b, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, and the first RACH configuration indicating a first mapping of a first set of SSBs to a first set of ROs associated with the uplink subband of the SBFD slot type. For example, the control signaling may be RRC signaling if the UE is in an RRC connected mode, or the control signaling may be a MIB or SIB if the UE is in an RRC idle mode.

At 910, the UE 115-b may transmit, to the network entity 105-b via a first uplink subband of a first slot of the SBFD slot type in accordance with the first RACH configuration, at least one instance of a RACH message via a first RO of the first set of ROs.

In some examples, the UE 115-b may transmit, to the network entity 105-b via a second uplink subband of a second slot of the SBFD slot type in accordance with the first RACH configuration, a second instance of the RACH message via a second RO, where the second RO is mapped to a same SSB of the first set of SSBs as the first RO. In some examples, receiving the control signaling at 905 includes receiving the control signaling indicating the first RACH configuration indicating a quantity of symbols associated with the first set of ROs, transmitting the at least one instance of the RACH message at 910 includes transmitting the at least one instance of the RACH message via the quantity of symbols, and transmitting the second instance of the RACH message includes transmitting the second instance via the quantity of symbols, and a first position of the quantity of symbols in the first slot corresponds to a second position of the quantity of symbols in the second slot.

In some examples, transmitting the at least one instance of the RACH message includes transmitting the at least one instance of the RACH message via the first slot and a second slot of the SBFD slot type, where the at least one instance of the RACH message is a single instance of the RACH message, where the first RO is included within the first slot and the second slot.

In some examples, the UE 115-b may receive, with the control signaling at 905, an indication of a second RACH configuration associated with an uplink slot type, the second RACH configuration indicating a second mapping of a second set of SSBs including the first set of SSBs to a second set of ROs.

In some examples, the UE 115-b may transmit, to the network entity 105-b via an uplink slot of the uplink slot type in accordance with the second RACH configuration, a second instance of the RACH message via a second RO of the second set of ROs, where the second RO is mapped to a same SSB of the first set of SSBs as the first RO. In some examples, the first RO includes a different set of frequency resources than the second RO. In some examples, the first RO includes a same set of frequency resources as the second RO.

In some examples, the UE 115-*b* may transmit the at least one instance of the RACH message via the first slot and an uplink slot of the uplink slot type, where the at least one instance of the RACH message is a single instance of the RACH message, where the first RO is included within the first slot and the uplink slot.

In some examples, receiving the control signaling at 905 includes receiving the control signaling indicating the first RACH configuration mapping the first set of SSBs to the first set of ROs across two or more slots of the SBFD slot type, where the first set of SSBs corresponds to the second set of SSBs, and where each of the second set of ROs corresponds to one of the first set of ROs.

In some examples, the first set of SSBs is a subset of the second set of SSBs. In some examples, receiving the control signaling at 905 includes receiving the control signaling indicating the first RACH configuration including a bitfield indicating the first set of SSBs. In some examples, receiving the control signaling at 905 includes receiving the control signaling indicating the first RACH configuration mapping the first set of SSBs to ROs within the first set of frequency resources and a remainder of the second set of SSBs to ROs within the second set of frequency resources.

In some examples, receiving the control signaling at 905 includes receiving the control signaling indicating the first RACH configuration indicating a first quantity of symbols associated with the first set of ROs and a second quantity of symbols associated with repetition for the first set of ROs within a same slot, and transmitting the at least one instance of the RACH message includes transmitting the at least one instance of the RACH message via the first quantity of symbols and transmitting a second instance of the RACH message via the first uplink subband of the first slot via the second quantity of symbols.

Figure 10:
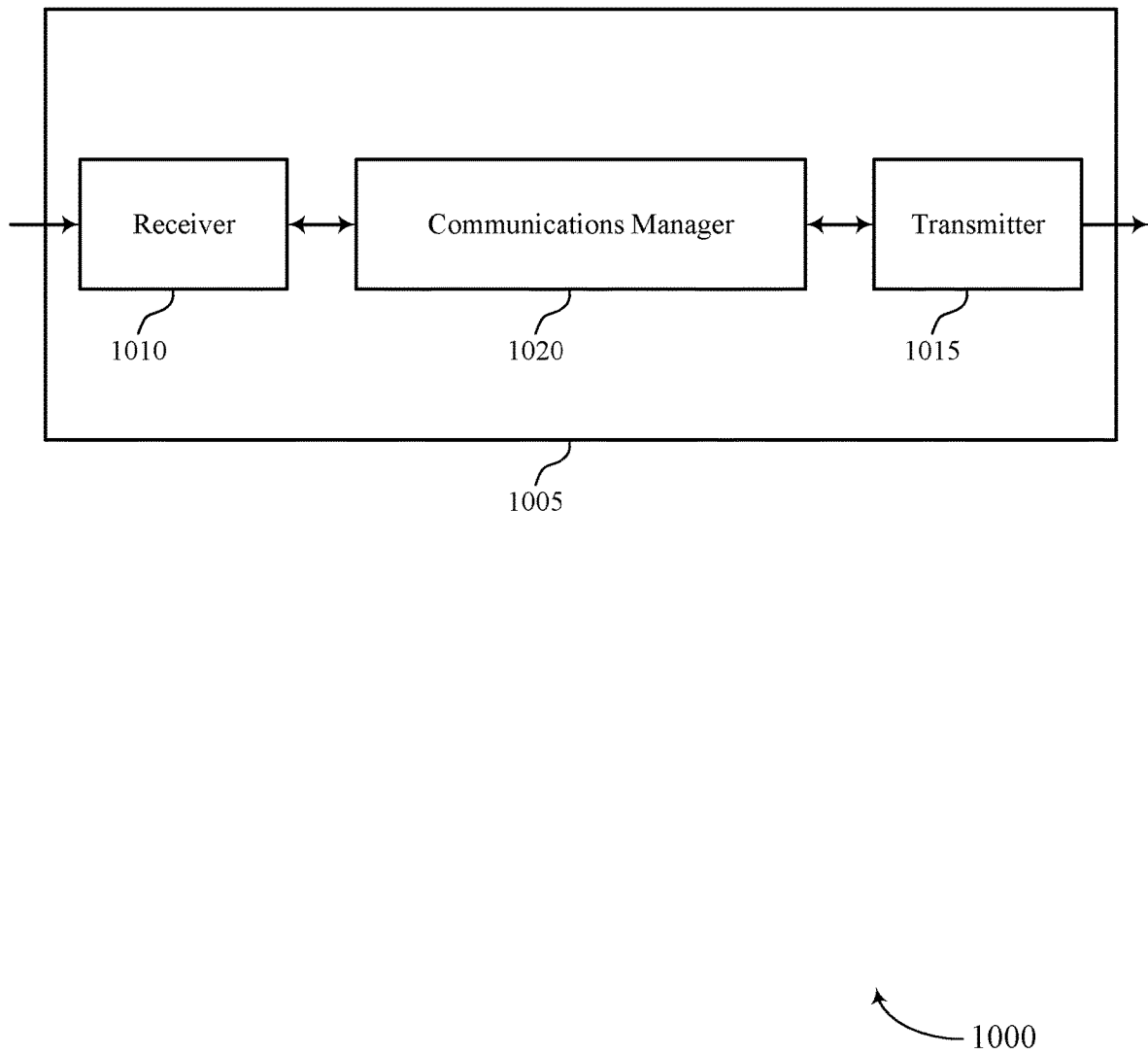
FIGS. 10 and 11 show block diagrams of devices that support PRACH for uplink-subband in SBFD in accordance with one or more aspects of the present disclosure.

FIG. 10 shows a block diagram 1000 of a device 1005 that supports PRACH for uplink-subband in SBFD in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to PRACH for uplink-subband in SBFD). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to PRACH for uplink-subband in SBFD). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of PRACH for uplink-subband in SBFD as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The communications manager 1020 may be configured as or otherwise support a means for transmitting, to the network entity via a first uplink subband of a first slot of the SBFD slot type in accordance with the first RACH configuration, at least one instance of a RACH message via a first RACH occasion of the first set of RACH occasions.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
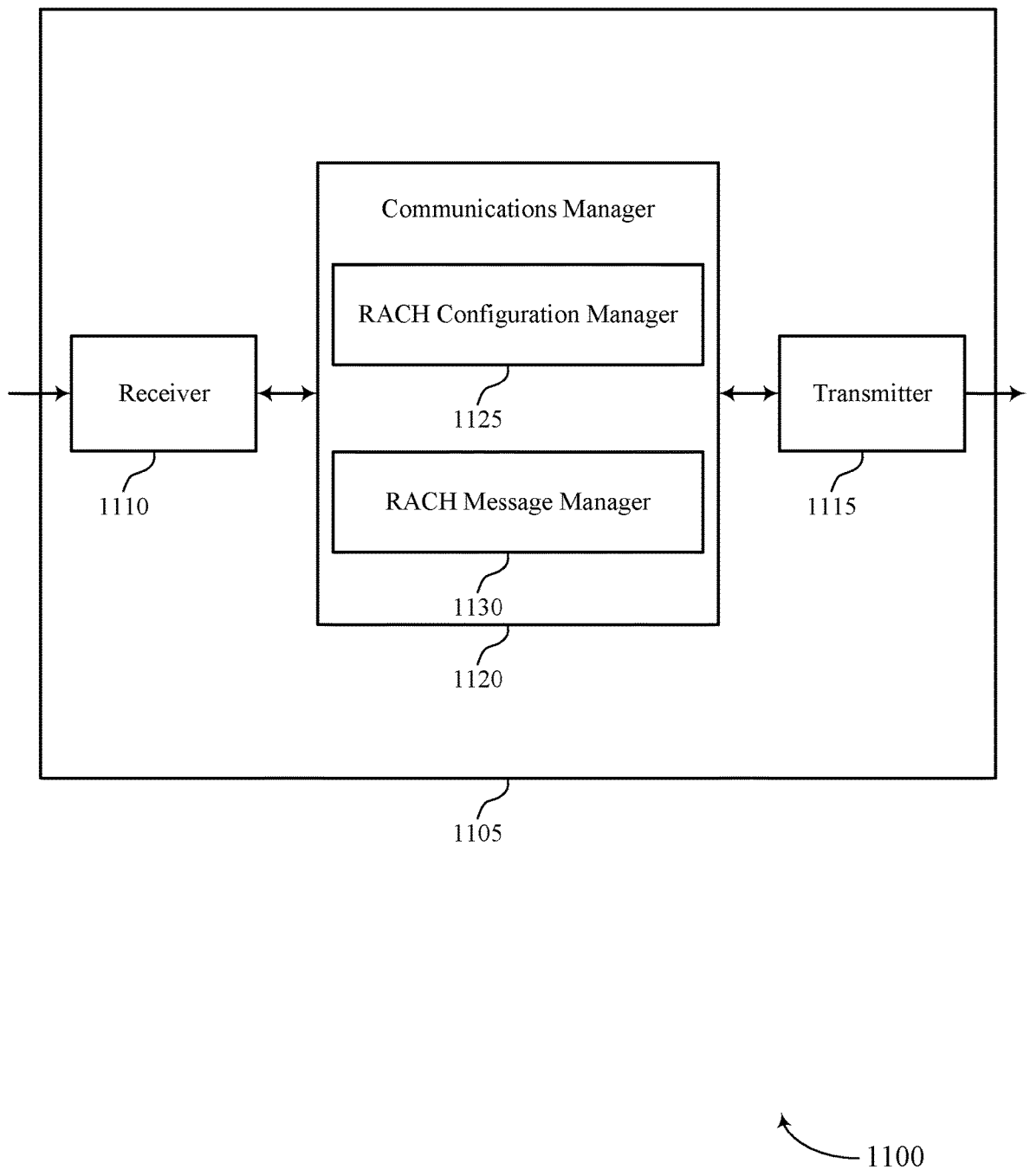

FIG. 11 shows a block diagram 1100 of a device 1105 that supports PRACH for uplink-subband in SBFD in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to PRACH for uplink-subband in SBFD). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to PRACH for uplink-subband in SBFD). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of PRACH for uplink-subband in SBFD as described herein. For example, the communications manager 1120 may include a RACH configuration manager 1125 a RACH message manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The RACH configuration manager 1125 may be configured as or otherwise support a means for receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The RACH message manager 1130 may be configured as or otherwise support a means for transmitting, to the network entity via a first uplink subband of a first slot of the SBFD slot type in accordance with the first RACH configuration, at least one instance of a RACH message via a first RACH occasion of the first set of RACH occasions.

Figure 12:
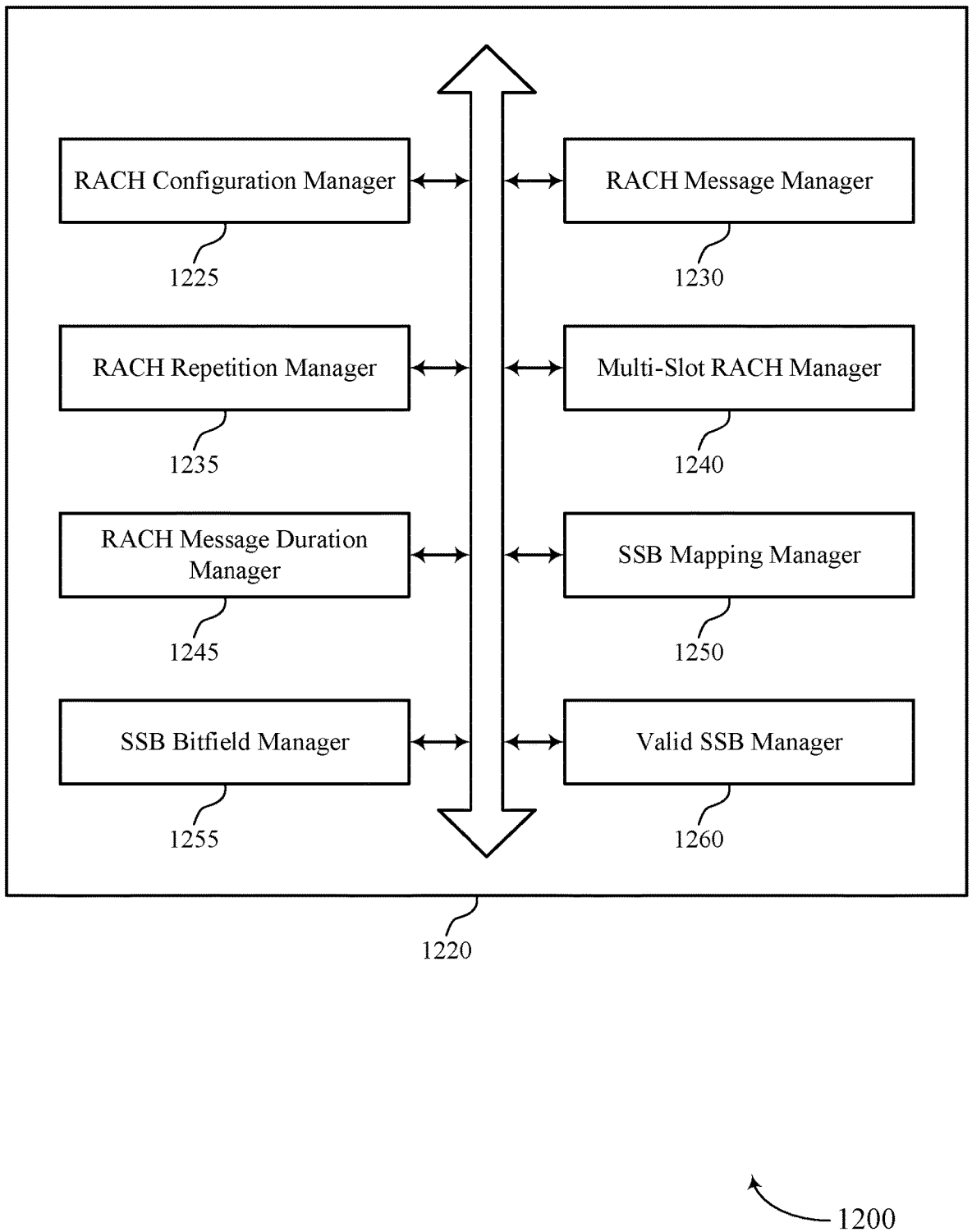
FIG. 12 shows a block diagram of a communications manager that supports PRACH for uplink-subband in SBFD in accordance with one or more aspects of the present disclosure.

FIG. 12 shows a block diagram 1200 of a communications manager 1220 that supports PRACH for uplink-subband in SBFD in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of PRACH for uplink-subband in SBFD as described herein. For example, the communications manager 1220 may include a RACH configuration manager 1225, a RACH message manager 1230, a RACH repetition manager 1235, a multi-slot RACH manager 1240, a RACH message duration manager 1245, an SSB mapping manager 1250, an SSB bitfield manager 1255, a valid SSB manager 1260, or any combination thereof. Each of these components may communicate, directly or indirectly, with one another (e.g., via one or more buses).

The communications manager 1220 may support wireless communications at a UE in accordance with examples as disclosed herein. The RACH configuration manager 1225 may be configured as or otherwise support a means for receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The RACH message manager 1230 may be configured as or otherwise support a means for transmitting, to the network entity via a first uplink subband of a first slot of the SBFD slot type in accordance with the first RACH configuration, at least one instance of a RACH message via a first RACH occasion of the first set of RACH occasions.

In some examples, the RACH repetition manager 1235 may be configured as or otherwise support a means for transmitting, to the network entity via a second uplink subband of a second slot of the SBFD slot type in accordance with the first RACH configuration, a second instance of the RACH message via a second RACH occasion, where the second RACH occasion is mapped to a same SSB of the first set of SSBs as the first RACH occasion.

In some examples, to support receiving the control signaling, the RACH message duration manager 1245 may be configured as or otherwise support a means for receiving the control signaling indicating the first RACH configuration indicating a quantity of symbols associated with the first set of RACH occasions, and where transmitting the at least one instance of the RACH message includes transmitting the at least one instance of the RACH message via the quantity of symbols, where transmitting the second instance of the RACH message includes transmitting the second instance via the quantity of symbols, and where a first position of the quantity of symbols in the first slot correspond to a second position of the quantity of symbols in the second slot.

In some examples, to support transmitting the at least one instance of the RACH message, the multi-slot RACH manager 1240 may be configured as or otherwise support a means for transmitting the at least one instance of the RACH message via the first slot and a second slot of the SBFD slot type, where the at least one instance of the RACH message is a single instance of the RACH message, where the first RACH occasion is included within the first slot and the second slot.

In some examples, the RACH configuration manager 1225 may be configured as or otherwise support a means for receiving, with the control signaling, an indication of a second RACH configuration associated with an uplink slot type, the second RACH configuration indicating a second mapping of a second set of SSBs including the first set of SSBs to a second set of RACH occasions.

In some examples, the RACH repetition manager 1235 may be configured as or otherwise support a means for transmitting, to the network entity via an uplink slot of the uplink slot type in accordance with the second RACH configuration, a second instance of the RACH message via a second RACH occasion of the second set of RACH occasions, where the second RACH occasion is mapped to a same SSB of the first set of SSBs as the first RACH occasion.

In some examples, the first RACH occasion includes a different set of frequency resources than the second RACH occasion.

In some examples, the first RACH occasion includes a same set of frequency resources as the second RACH occasion.

In some examples, the multi-slot RACH manager 1240 may be configured as or otherwise support a means for transmitting the at least one instance of the RACH message via the first slot and an uplink slot of the uplink slot type, where the at least one instance of the RACH message is a single instance of the RACH message, where the first RACH occasion is included within the first slot and the uplink slot.

In some examples, to support receiving the control signaling, the SSB mapping manager 1250 may be configured as or otherwise support a means for receiving the control signaling indicating the first RACH configuration mapping the first set of SSBs to the first set of RACH occasions across two or more slots of the SBFD slot type, where the first set of SSBs corresponds to the second set of SSBs, and where each of the second set of RACH occasions corresponds to one of the first set of RACH occasions.

In some examples, the first set of SSBs is a subset of the second set of SSBs.

In some examples, to support receiving the control signaling, the SSB bitfield manager 1255 may be configured as or otherwise support a means for receiving the control signaling indicating the first RACH configuration including a bitfield indicating the first set of SSBs.

In some examples, to support receiving the control signaling, the valid SSB manager 1260 may be configured as or otherwise support a means for receiving the control signaling indicating the first RACH configuration mapping the first set of SSBs to RACH occasions within the first set of frequency resources and a remainder of the second set of SSBs to RACH occasions within the second set of frequency resources.

In some examples, to support receiving the control signaling, the RACH message duration manager 1245 may be configured as or otherwise support a means for receiving the control signaling indicating the first RACH configuration indicating a first quantity of symbols associated with the first set of RACH occasions and a second quantity of symbols associated with repetition for the first set of RACH occasions within a same slot, and where transmitting the at least one instance of the RACH message includes transmitting the at least one instance of the RACH message via the first quantity of symbols and transmitting a second instance of the RACH message via the first uplink subband of the first slot via the second quantity of symbols.

Figure 13:
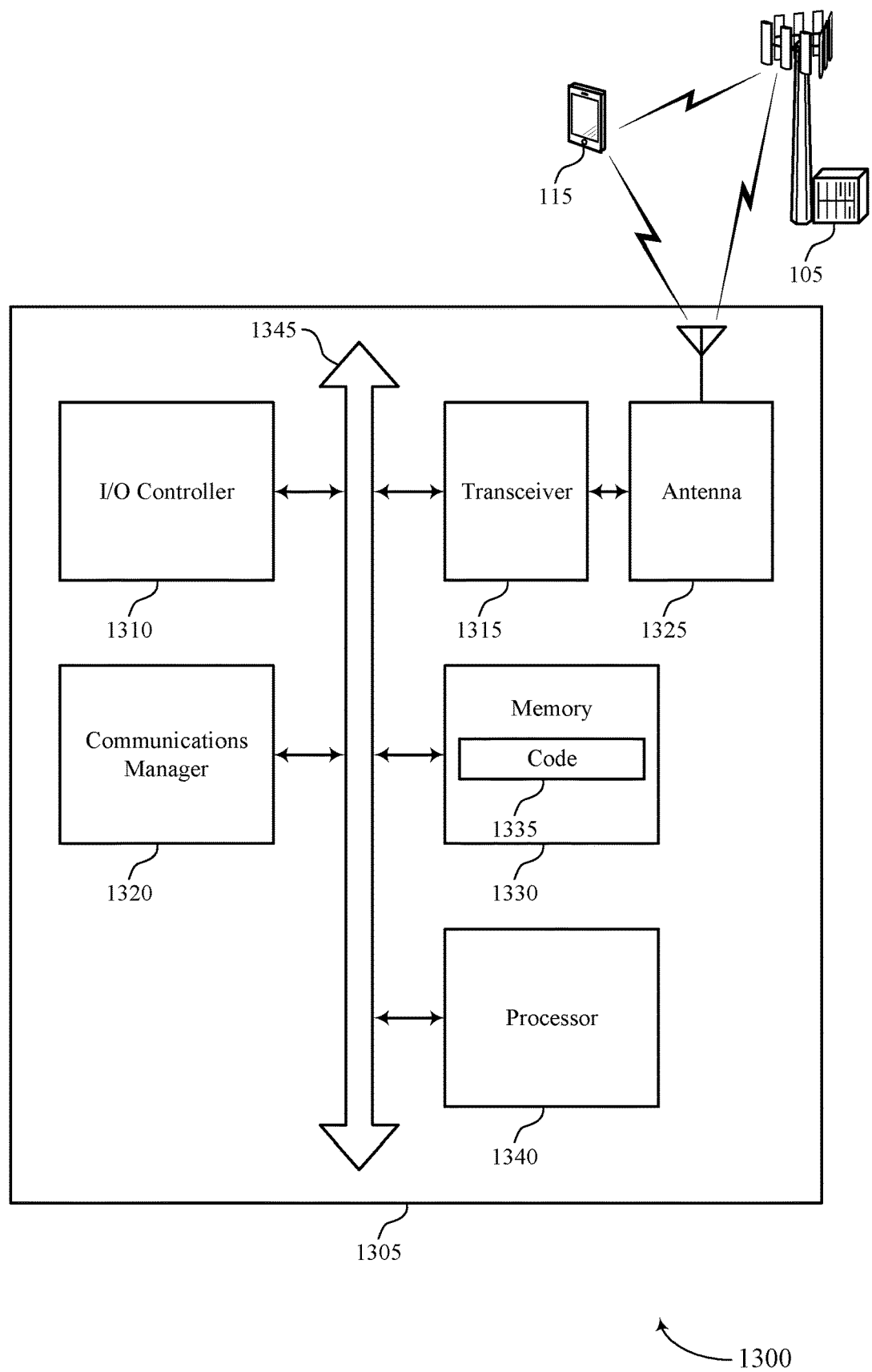
FIG. 13 shows a diagram of a system including a device that supports PRACH for uplink-subband in SBFD in accordance with one or more aspects of the present disclosure.

FIG. 13 shows a diagram of a system 1300 including a device 1305 that supports PRACH for uplink-subband in SBFD in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting PRACH for uplink-subband in SBFD). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The communications manager 1320 may be configured as or otherwise support a means for transmitting, to the network entity via a first uplink subband of a first slot of the SBFD slot type in accordance with the first RACH configuration, at least one instance of a RACH message via a first RACH occasion of the first set of RACH occasions.

By including or configuring the communications manager 1320 in accordance with examples as described herein, the device 1305 may support techniques for improved communication reliability, reduced latency, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of PRACH for uplink-subband in SBFD as described herein, or the processor 1340 and the memory 1330 may be otherwise configured to perform or support such operations.

Figure 14:
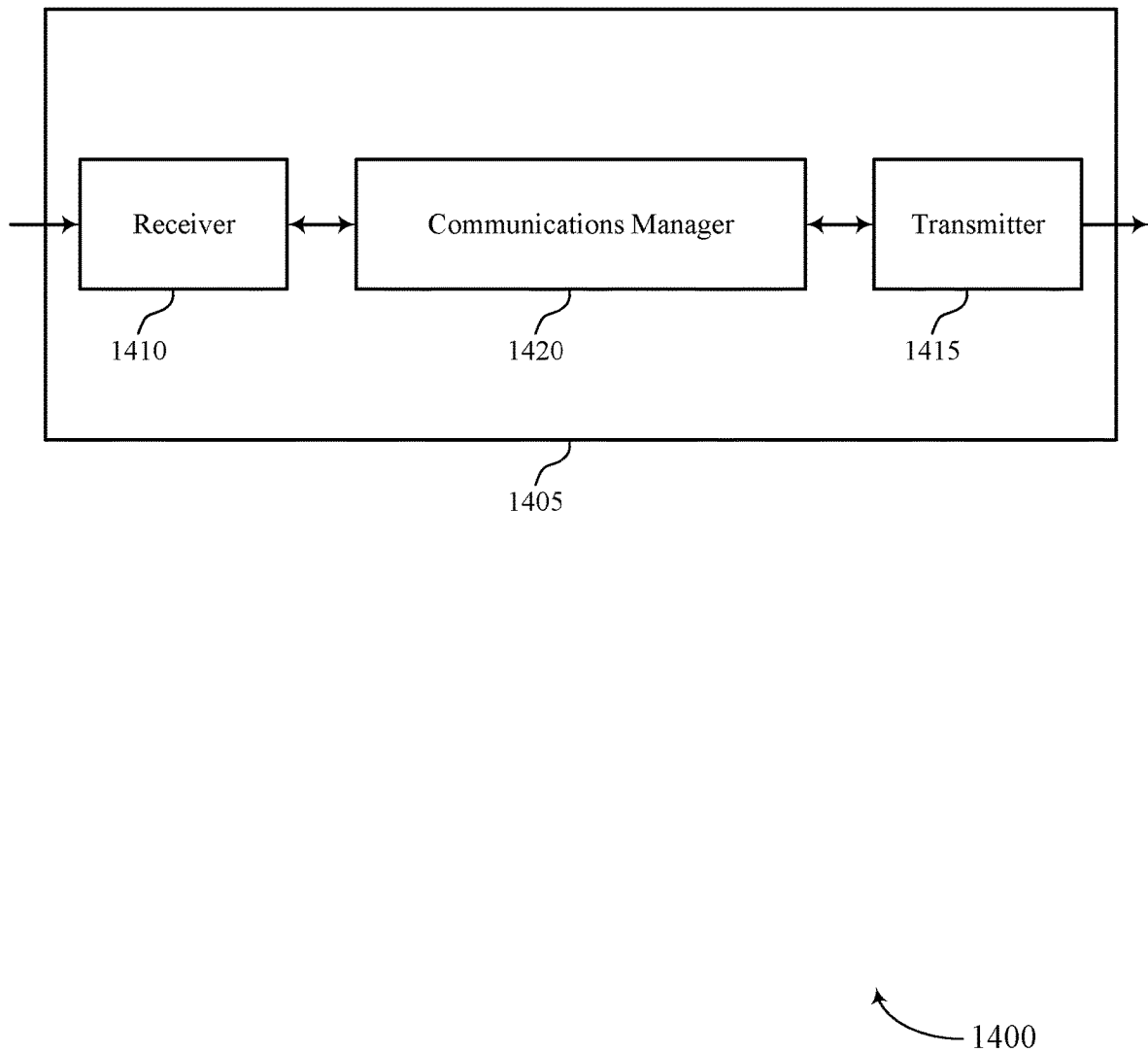
FIGS. 14 and 15 show block diagrams of devices that support PRACH for uplink-subband in SBFD in accordance with one or more aspects of the present disclosure.

FIG. 14 shows a block diagram 1400 of a device 1405 that supports PRACH for uplink-subband in SBFD in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of PRACH for uplink-subband in SBFD as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 may be configured as or otherwise support a means for transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The communications manager 1420 may be configured as or otherwise support a means for receiving, from the UE via a first uplink subband of a first slot of the SBFD slot type in accordance with the first RACH configuration, at least one instance of a RACH message via a first RACH occasion of the first set of RACH occasions.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for more efficient utilization of communication resources.

Figure 15:
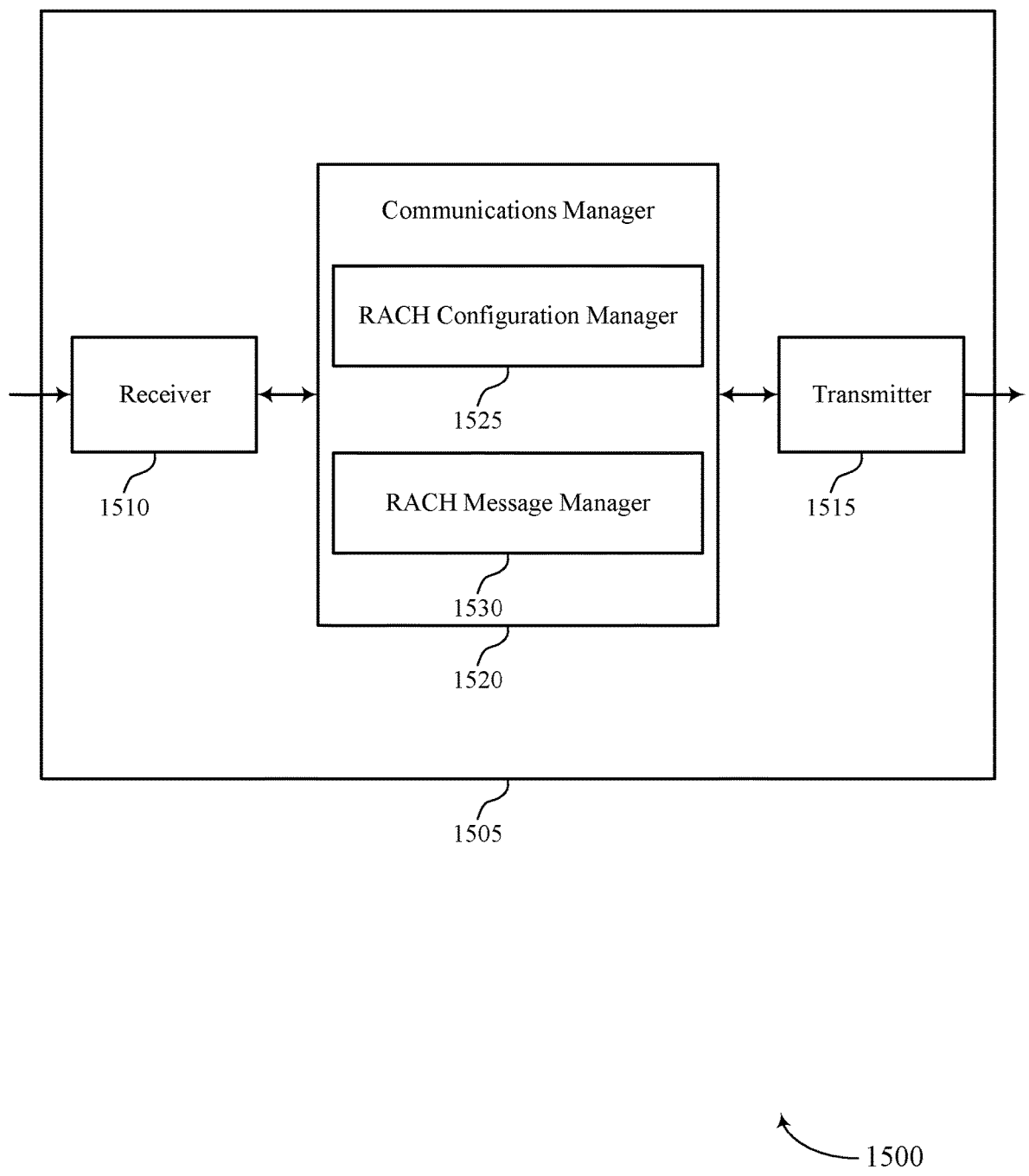

FIG. 15 shows a block diagram 1500 of a device 1505 that supports PRACH for uplink-subband in SBFD in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of PRACH for uplink-subband in SBFD as described herein. For example, the communications manager 1520 may include a RACH configuration manager 1525 a RACH message manager 1530, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The RACH configuration manager 1525 may be configured as or otherwise support a means for transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The RACH message manager 1530 may be configured as or otherwise support a means for receiving, from the UE via a first uplink subband of a first slot of the SBFD slot type in accordance with the first RACH configuration, at least one instance of a RACH message via a first RACH occasion of the first set of RACH occasions.

Figure 16:
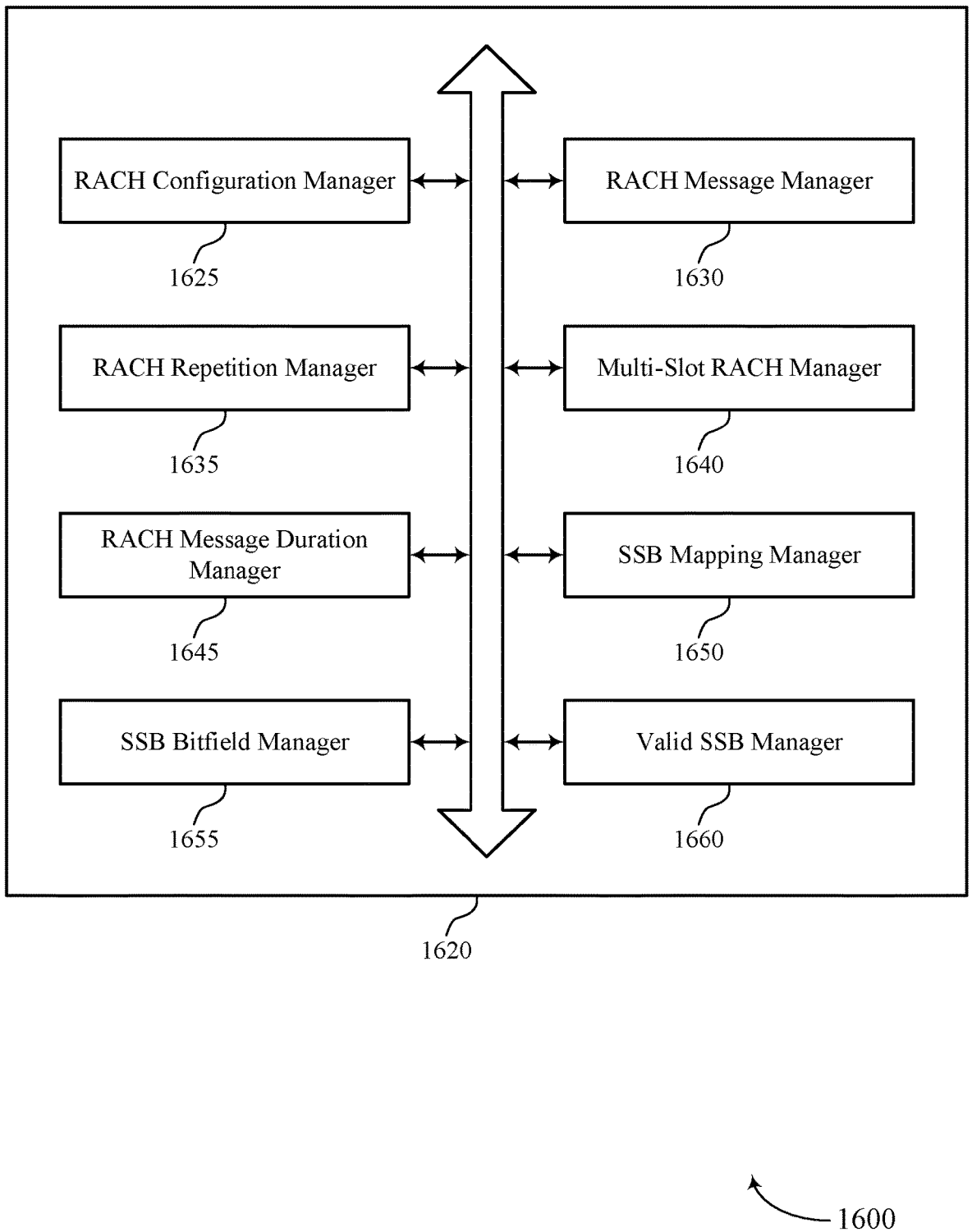
FIG. 16 shows a block diagram of a communications manager that supports PRACH for uplink-subband in SBFD in accordance with one or more aspects of the present disclosure.

FIG. 16 shows a block diagram 1600 of a communications manager 1620 that supports PRACH for uplink-subband in SBFD in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of PRACH for uplink-subband in SBFD as described herein. For example, the communications manager 1620 may include a RACH configuration manager 1625, a RACH message manager 1630, a RACH repetition manager 1635, a multi-slot RACH manager 1640, a RACH message duration manager 1645, an SSB mapping manager 1650, an SSB bitfield manager 1655, a valid SSB manager 1660, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The RACH configuration manager 1625 may be configured as or otherwise support a means for transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The RACH message manager 1630 may be configured as or otherwise support a means for receiving, from the UE via a first uplink subband of a first slot of the SBFD slot type in accordance with the first RACH configuration, at least one instance of a RACH message via a first RACH occasion of the first set of RACH occasions.

In some examples, the RACH repetition manager 1635 may be configured as or otherwise support a means for receiving, from the UE via a second uplink subband of a second slot of the SBFD slot type in accordance with the first RACH configuration, a second instance of the RACH message via a second RACH occasion, where the second RACH occasion is mapped to a same SSB of the first set of SSBs as the first RACH occasion.

In some examples, to support transmitting the control signaling, the RACH message duration manager 1645 may be configured as or otherwise support a means for transmitting the control signaling indicating the first RACH configuration indicating a quantity of symbols associated with the first set of RACH occasions, and where receiving the at least one instance of the RACH message includes receiving the at least one instance of the RACH message via the quantity of symbols, where receiving the second instance of the RACH message includes receiving the second instance via the quantity of symbols, and where a first position of the quantity of symbols in the first slot correspond to a second position of the quantity of symbols in the second slot.

In some examples, to support receiving the at least one instance of the RACH message, the multi-slot RACH manager 1640 may be configured as or otherwise support a means for receiving the at least one instance of the RACH message via the first slot and a second slot of the SBFD slot type, where the at least one instance of the RACH message is a single instance of the RACH message, where the first RACH occasion is included within the first slot and the second slot.

In some examples, the RACH configuration manager 1625 may be configured as or otherwise support a means for transmitting, with the control signaling, an indication of a second RACH configuration associated with an uplink slot type, the second RACH configuration indicating a second mapping of a second set of SSBs including the first set of SSBs to a second set of RACH occasions.

In some examples, the RACH repetition manager 1635 may be configured as or otherwise support a means for receiving, from the UE via an uplink slot of the uplink slot type in accordance with the second RACH configuration, a second instance of the RACH message via a second RACH occasion of the second set of RACH occasions, where the second RACH occasion is mapped to a same SSB of the first set of SSBs as the first RACH occasion.

In some examples, the first RACH occasion includes a different set of frequency resources than the second RACH occasion.

In some examples, the first RACH occasion includes a same set of frequency resources as the second RACH occasion.

In some examples, the multi-slot RACH manager 1640 may be configured as or otherwise support a means for receiving the at least one instance of the RACH message via the first slot and an uplink slot of the uplink slot type, where the at least one instance of the RACH message is a single instance of the RACH message, where the first RACH occasion is included within the first slot and the uplink slot.

In some examples, to support transmitting the control signaling, the SSB mapping manager 1650 may be configured as or otherwise support a means for transmitting the control signaling indicating the first RACH configuration mapping the first set of SSBs to the first set of RACH occasions across two or more slots of the SBFD slot type, where the first set of SSBs corresponds to the second set of SSBs, and where each of the second set of RACH occasions corresponds to one of the first set of RACH occasions.

In some examples, the first set of SSBs is a subset of the second set of SSBs.

In some examples, to support transmitting the control signaling, the SSB bitfield manager 1655 may be configured as or otherwise support a means for transmitting the control signaling indicating the first RACH configuration including a bitfield indicating the first set of SSBs.

In some examples, to support transmitting the control signaling, the valid SSB manager 1660 may be configured as or otherwise support a means for transmitting the control signaling indicating the first RACH configuration mapping the first set of SSBs to RACH occasions within the first set of frequency resources and a remainder of the second set of SSBs to RACH occasions within the second set of frequency resources.

In some examples, to support transmitting the control signaling, the RACH message duration manager 1645 may be configured as or otherwise support a means for transmitting the control signaling indicating the first RACH configuration indicating a first quantity of symbols associated with the first set of RACH occasions and a second quantity of symbols associated with repetition for the first set of RACH occasions within a same slot, and where receiving the at least one instance of the RACH message includes receiving the at least one instance of the RACH message via the first quantity of symbols and receiving a second instance of the RACH message via the first uplink subband of the first slot via the second quantity of symbols.

Figure 17:
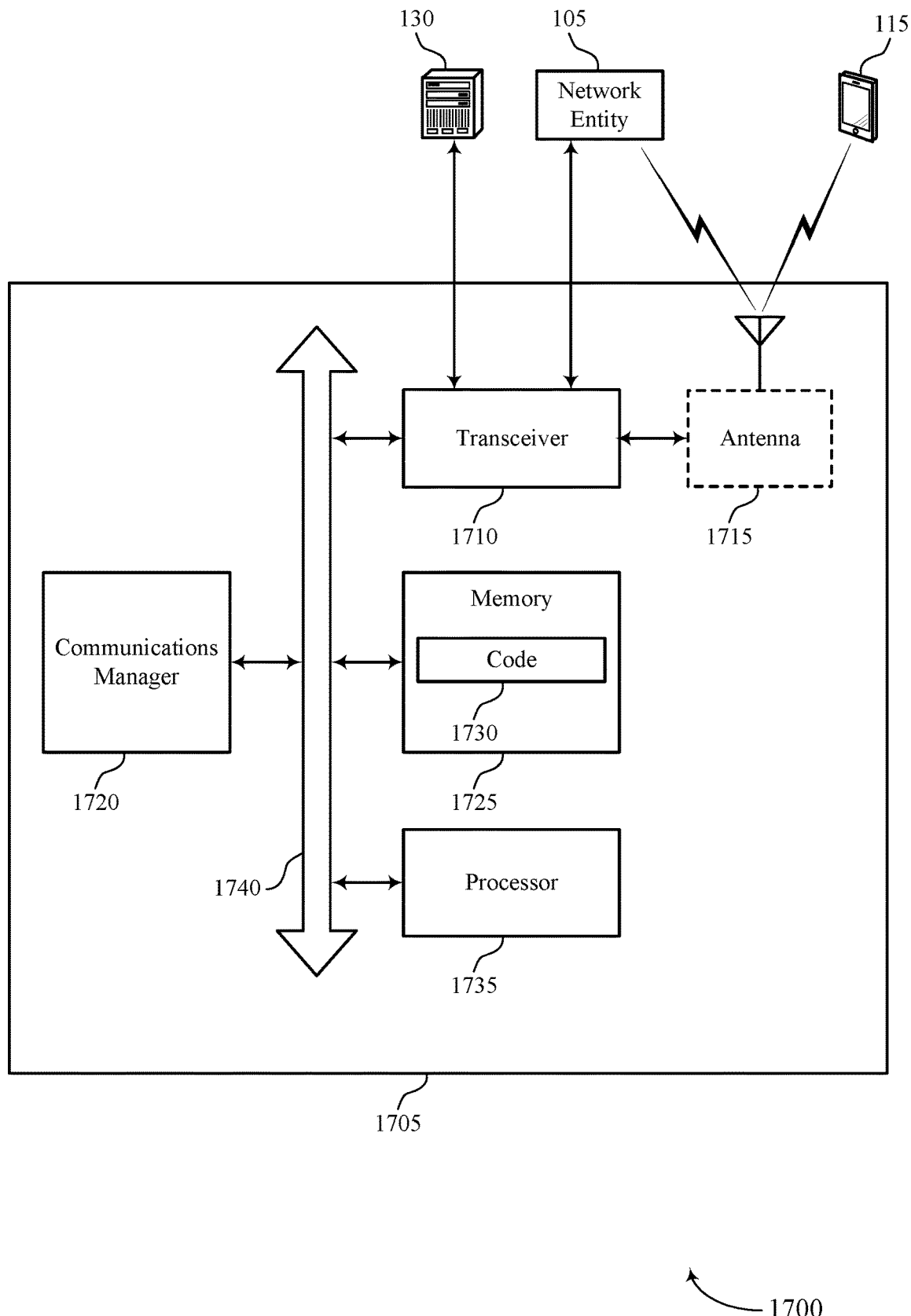
FIG. 17 shows a diagram of a system including a device that supports PRACH for uplink-subband in SBFD in accordance with one or more aspects of the present disclosure.

FIG. 17 shows a diagram of a system 1700 including a device 1705 that supports PRACH for uplink-subband in SBFD in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting PRACH for uplink-subband in SBFD). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a network entity in accordance with examples as disclosed herein. For example, the communications manager 1720 may be configured as or otherwise support a means for transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The communications manager 1720 may be configured as or otherwise support a means for receiving, from the UE via a first uplink subband of a first slot of the SBFD slot type in accordance with the first RACH configuration, at least one instance of a RACH message via a first RACH occasion of the first set of RACH occasions.

By including or configuring the communications manager 1720 in accordance with examples as described herein, the device 1705 may support techniques for improved communication reliability, reduced latency, more efficient utilization of communication resources, and improved coordination between devices.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of PRACH for uplink-subband in SBFD as described herein, or the processor 1735 and the memory 1725 may be otherwise configured to perform or support such operations.

Figure 18:
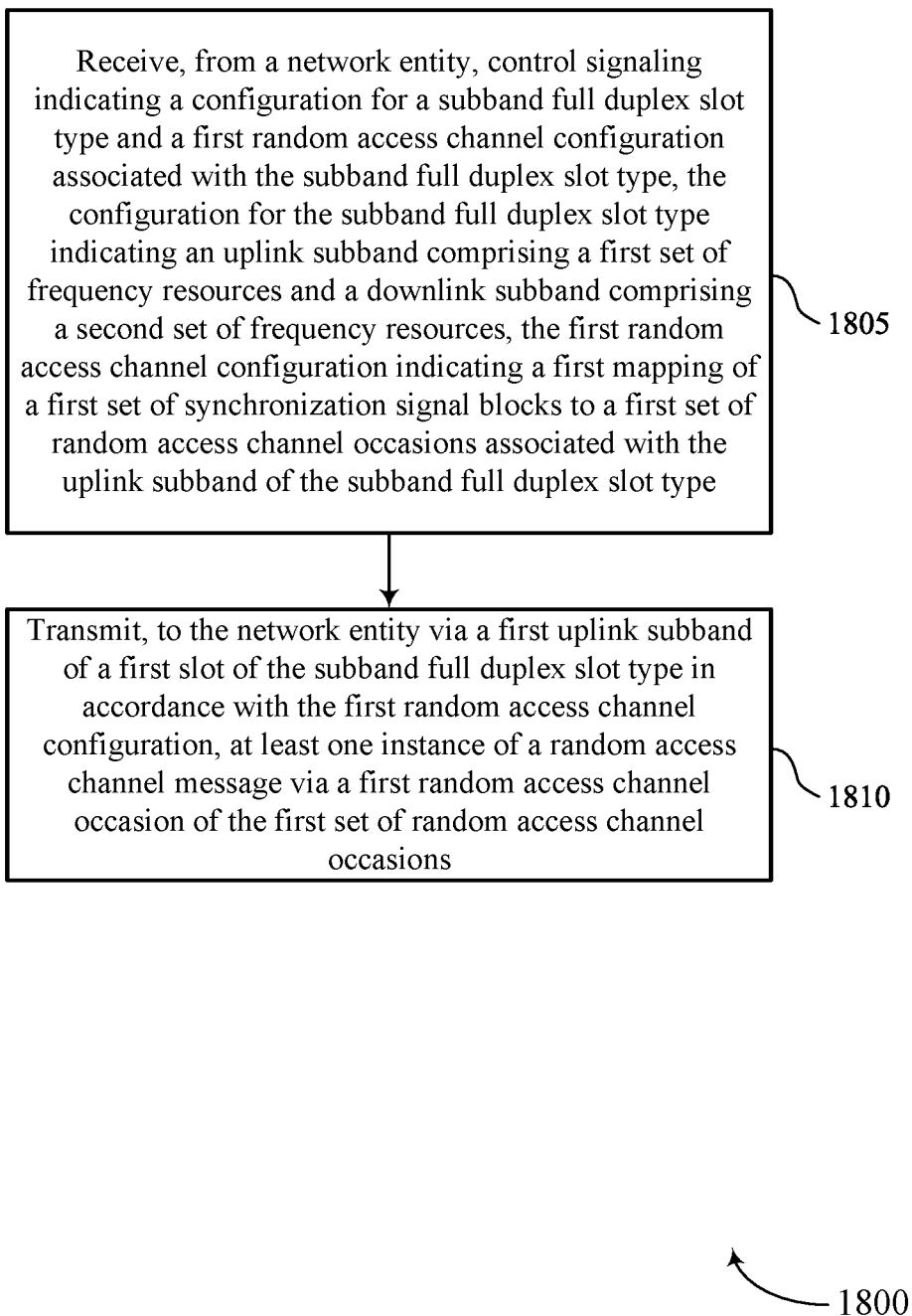
FIGS. 18 through 21 show flowcharts illustrating methods that support PRACH for uplink-subband in SBFD in accordance with one or more aspects of the present disclosure.

FIG. 18 shows a flowchart illustrating a method 1800 that supports PRACH for uplink-subband in SBFD in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The operations of 1805 may be performed in accordance with examples as disclosed herein. In some examples, aspects of the operations of 1805 may be performed by a RACH configuration manager 1225 as described with reference to FIG. 12.

At 1810, the method may include transmitting, to the network entity via a first uplink subband of a first slot of the SBFD slot type in accordance with the first RACH configuration, at least one instance of a RACH message via a first RACH occasion of the first set of RACH occasions. The operations of 1810 may be performed in accordance with examples as disclosed herein. In some examples, aspects of the operations of 1810 may be performed by a RACH message manager 1230 as described with reference to FIG. 12.

Figure 19:
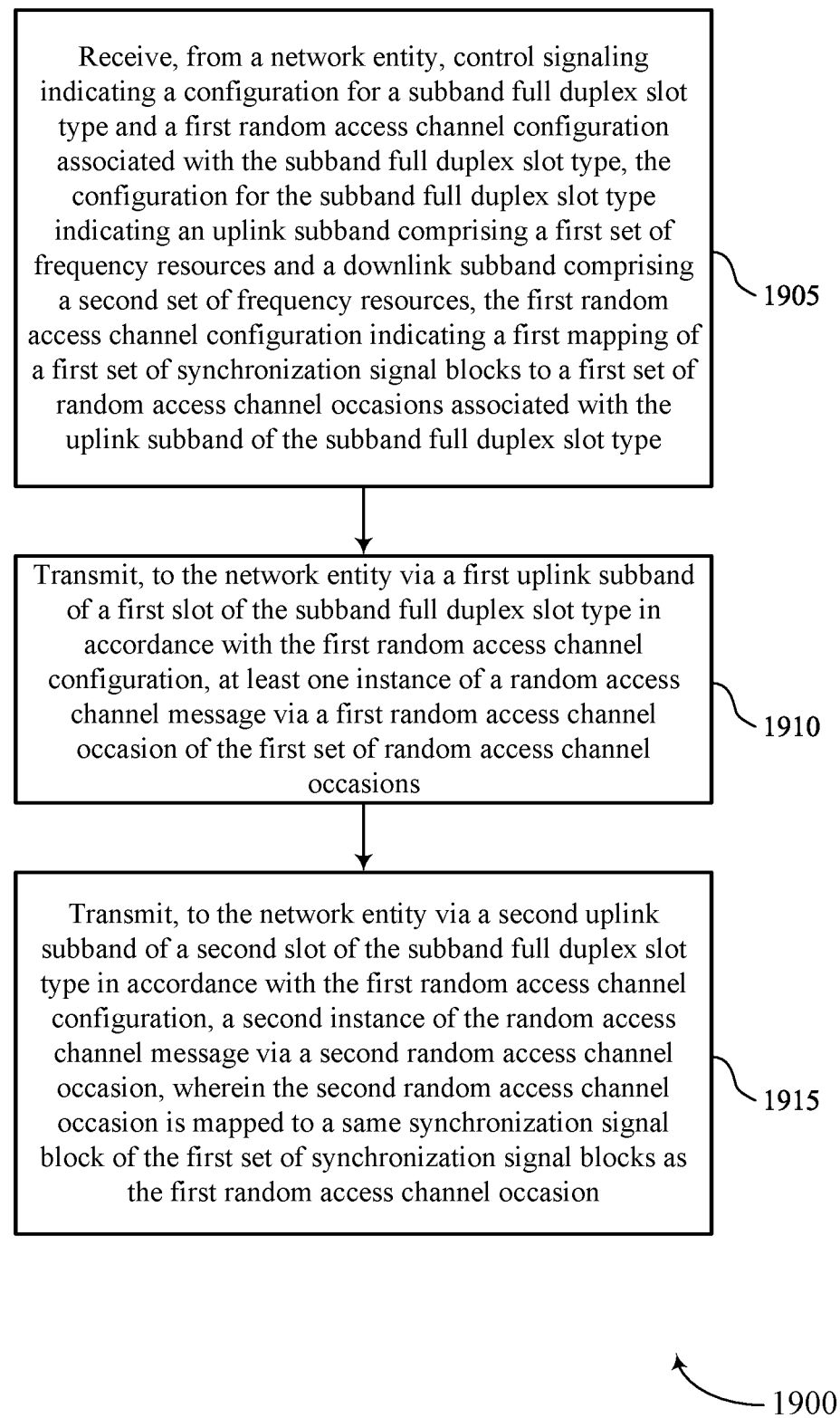

FIG. 19 shows a flowchart illustrating a method 1900 that supports PRACH for uplink-subband in SBFD in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving, from a network entity, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The operations of 1905 may be performed in accordance with examples as disclosed herein. In some examples, aspects of the operations of 1905 may be performed by a RACH configuration manager 1225 as described with reference to FIG. 12.

At 1910, the method may include transmitting, to the network entity via a first uplink subband of a first slot of the SBFD slot type in accordance with the first RACH configuration, at least one instance of a RACH message via a first RACH occasion of the first set of RACH occasions. The operations of 1910 may be performed in accordance with examples as disclosed herein. In some examples, aspects of the operations of 1910 may be performed by a RACH message manager 1230 as described with reference to FIG. 12.

At 1915, the method may include transmitting, to the network entity via a second uplink subband of a second slot of the SBFD slot type in accordance with the first RACH configuration, a second instance of the RACH message via a second RACH occasion, where the second RACH occasion is mapped to a same SSB of the first set of SSBs as the first RACH occasion. The operations of 1915 may be performed in accordance with examples as disclosed herein. In some examples, aspects of the operations of 1915 may be performed by a RACH repetition manager 1235 as described with reference to FIG. 12.

Figure 20:
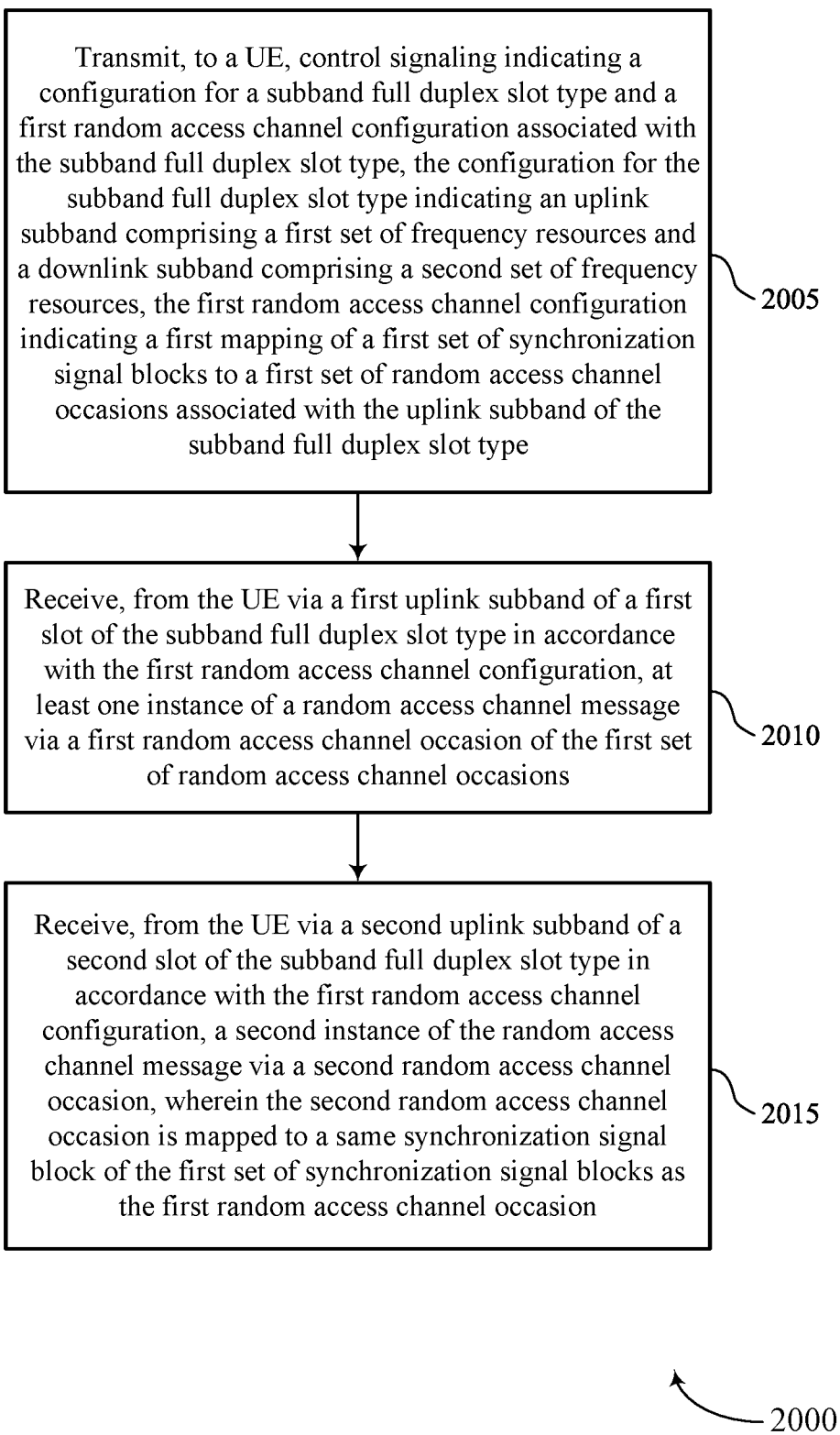

FIG. 20 shows a flowchart illustrating a method 2000 that supports PRACH for uplink-subband in SBFD in accordance with one or more aspects of the present disclosure. The operations of the method 2000 may be implemented by a network entity or its components as described herein. For example, the operations of the method 2000 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The operations of 2005 may be performed in accordance with examples as disclosed herein. In some examples, aspects of the operations of 2005 may be performed by a RACH configuration manager 1625 as described with reference to FIG. 16.

At 2010, the method may include receiving, from the UE via a first uplink subband of a first slot of the SBFD slot type in accordance with the first RACH configuration, at least one instance of a RACH message via a first RACH occasion of the first set of RACH occasions. The operations of 2010 may be performed in accordance with examples as disclosed herein. In some examples, aspects of the operations of 2010 may be performed by a RACH message manager 1630 as described with reference to FIG. 16.

At 2015, the method may include receiving, from the UE via a second uplink subband of a second slot of the SBFD slot type in accordance with the first RACH configuration, a second instance of the RACH message via a second RACH occasion, where the second RACH occasion is mapped to a same SSB of the first set of SSBs as the first RACH occasion. The operations of 2015 may be performed in accordance with examples as disclosed herein. In some examples, aspects of the operations of 2015 may be performed by a RACH repetition manager 1635 as described with reference to FIG. 16.

Figure 21:
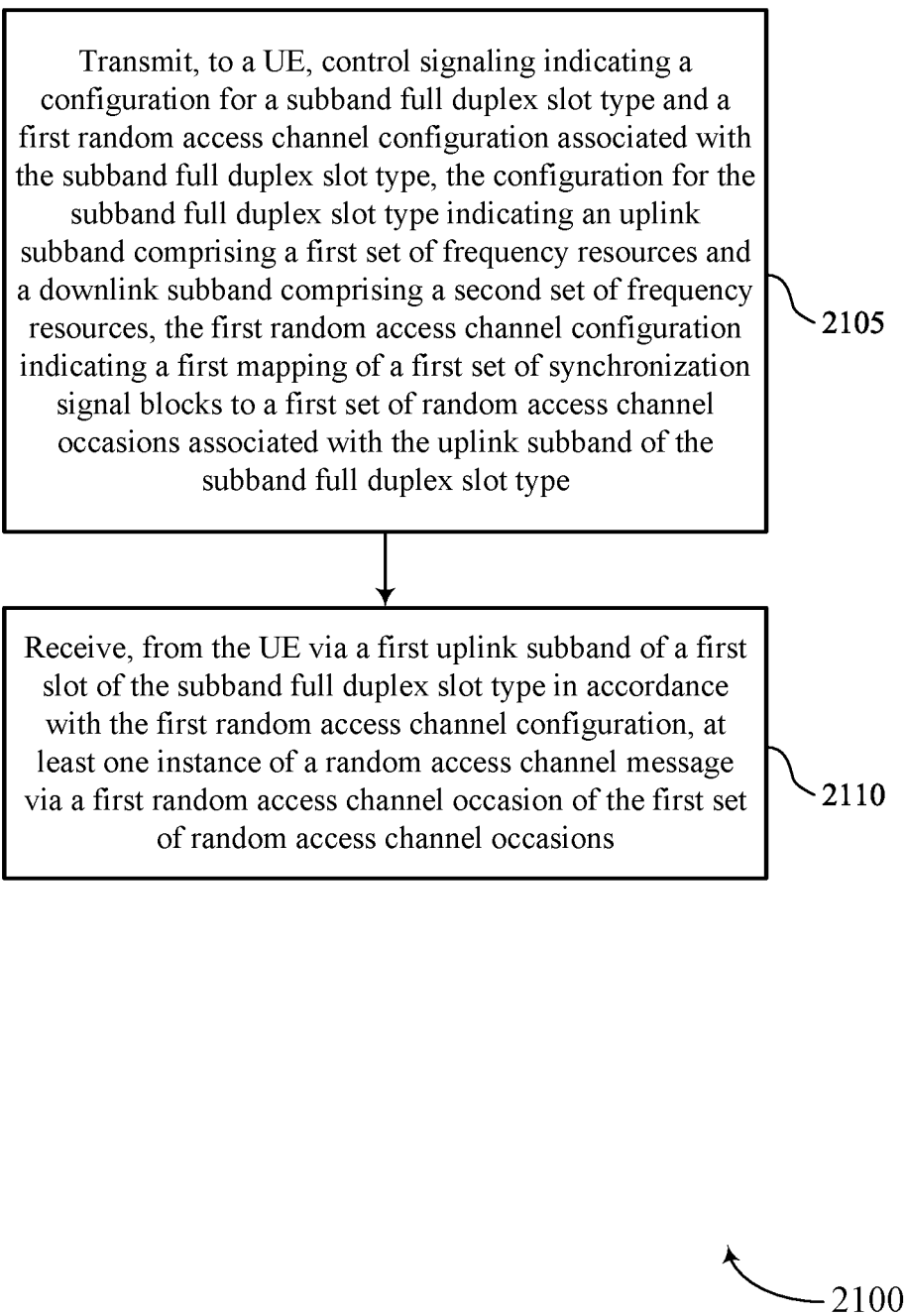

FIG. 21 shows a flowchart illustrating a method 2100 that supports PRACH for uplink-subband in SBFD in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, to a UE, control signaling indicating a configuration for a SBFD slot type and a first RACH configuration associated with the SBFD slot type, the configuration for the SBFD slot type indicating an uplink subband including a first set of frequency resources and a downlink subband including a second set of frequency resources, the first RACH configuration indicating a first mapping of a first set of SSBs to a first set of RACH occasions associated with the uplink subband of the SBFD slot type. The operations of 2105 may be performed in accordance with examples as disclosed herein. In some examples, aspects of the operations of 2105 may be performed by a RACH configuration manager 1625 as described with reference to FIG. 16.

At 2110, the method may include receiving, from the UE via a first uplink subband of a first slot of the SBFD slot type in accordance with the first RACH configuration, at least one instance of a RACH message via a first RACH occasion of the first set of RACH occasions. The operations of 2110 may be performed in accordance with examples as disclosed herein. In some examples, aspects of the operations of 2110 may be performed by a RACH message manager 1630 as described with reference to FIG. 16.

The following provides an overview of aspects of the present disclosure:

Aspect 1: A method for wireless communications at a UE, comprising: receiving, from a network entity, control signaling indicating a configuration for a SBFD slot type and a first RACH configuration associated with the SBFD slot type, the configuration for the SBFD slot type indicating an uplink subband comprising a first set of frequency resources and a downlink subband comprising a second set of frequency resources, the first RACH configuration indicating a first mapping of a first set of SSBs to a first set of RACH occasions associated with the uplink subband of the SBFD slot type; and transmitting, to the network entity via a first uplink subband of a first slot of the SBFD slot type in accordance with the first RACH configuration, at least one instance of a RACH message via a first RACH occasion of the first set of RACH occasions.

Aspect 2: The method of aspect 1, further comprising: transmitting, to the network entity via a second uplink subband of a second slot of the SBFD slot type in accordance with the first RACH configuration, a second instance of the RACH message via a second RACH occasion, wherein the second RACH occasion is mapped to a same SSB of the first set of SSBs as the first RACH occasion.

Aspect 3: The method of aspect 2, wherein receiving the control signaling comprises: receiving the control signaling indicating the first RACH configuration indicating a quantity of symbols associated with the first set of RACH occasions, and wherein transmitting the at least one instance of the RACH message comprises transmitting the at least one instance of the RACH message via the quantity of symbols, wherein transmitting the second instance of the RACH message comprises transmitting the second instance via the quantity of symbols, and wherein a first position of the quantity of symbols in the first slot correspond to a second position of the quantity of symbols in the second slot.

Aspect 4: The method of aspect 1, wherein transmitting the at least one instance of the RACH message comprises: transmitting the at least one instance of the RACH message via the first slot and a second slot of the SBFD slot type, wherein the at least one instance of the RACH message is a single instance of the RACH message, wherein the first RACH occasion is included within the first slot and the second slot.

Aspect 5: The method of any of aspects 1 through 4, further comprising: receiving, with the control signaling, an indication of a second RACH configuration associated with an uplink slot type, the second RACH configuration indicating a second mapping of a second set of SSBs comprising the first set of SSBs to a second set of RACH occasions.

Aspect 6: The method of aspect 5, further comprising: transmitting, to the network entity via an uplink slot of the uplink slot type in accordance with the second RACH configuration, a second instance of the RACH message via a second RACH occasion of the second set of RACH occasions, wherein the second RACH occasion is mapped to a same SSB of the first set of SSBs as the first RACH occasion.

Aspect 7: The method of aspect 6, wherein the first RACH occasion comprises a different set of frequency resources than the second RACH occasion.

Aspect 8: The method of aspect 6, wherein the first RACH occasion comprises a same set of frequency resources as the second RACH occasion.

Aspect 9: The method of any of aspects 5 through 8, further comprising: transmitting the at least one instance of the RACH message via the first slot and an uplink slot of the uplink slot type, wherein the at least one instance of the RACH message is a single instance of the RACH message, wherein the first RACH occasion is included within the first slot and the uplink slot.

Aspect 10: The method of any of aspects 5 through 9, wherein receiving the control signaling comprises: receiving the control signaling indicating the first RACH configuration mapping the first set of SSBs to the first set of RACH occasions across two or more slots of the SBFD slot type, wherein the first set of SSBs corresponds to the second set of SSBs, and wherein each of the second set of RACH occasions corresponds to one of the first set of RACH occasions.

Aspect 11: The method of any of aspects 5 through 9, wherein the first set of SSBs is a subset of the second set of SSBs.

Aspect 12: The method of aspect 11, wherein receiving the control signaling comprises: receiving the control signaling indicating the first RACH configuration comprising a bitfield indicating the first set of SSBs.

Aspect 13: The method of aspect 11, wherein receiving the control signaling comprises: receiving the control signaling indicating the first RACH configuration mapping the first set of SSBs to RACH occasions within the first set of frequency resources and a remainder of the second set of SSBs to RACH occasions within the second set of frequency resources.

Aspect 14: The method of any of aspects 1 through 13, wherein receiving the control signaling comprises: receiving the control signaling indicating the first RACH configuration indicating a first quantity of symbols associated with the first set of RACH occasions and a second quantity of symbols associated with repetition for the first set of RACH occasions within a same slot, and wherein transmitting the at least one instance of the RACH message comprises transmitting the at least one instance of the RACH message via the first quantity of symbols and transmitting a second instance of the RACH message via the first uplink subband of the first slot via the second quantity of symbols.

Aspect 15: A method for wireless communications at a network entity, comprising: transmitting, to a UE, control signaling indicating a configuration for a SBFD slot type and a first RACH configuration associated with the SBFD slot type, the configuration for the SBFD slot type indicating an uplink subband comprising a first set of frequency resources and a downlink subband comprising a second set of frequency resources, the first RACH configuration indicating a first mapping of a first set of SSBs to a first set of RACH occasions associated with the uplink subband of the SBFD slot type; and receiving, from the UE via a first uplink subband of a first slot of the SBFD slot type in accordance with the first RACH configuration, at least one instance of a RACH message via a first RACH occasion of the first set of RACH occasions.

Aspect 16: The method of aspect 15, further comprising: receiving, from the UE via a second uplink subband of a second slot of the SBFD slot type in accordance with the first RACH configuration, a second instance of the RACH message via a second RACH occasion, wherein the second RACH occasion is mapped to a same SSB of the first set of SSBs as the first RACH occasion.

Aspect 17: The method of aspect 16, wherein transmitting the control signaling comprises: transmitting the control signaling indicating the first RACH configuration indicating a quantity of symbols associated with the first set of RACH occasions, and wherein receiving the at least one instance of the RACH message comprises receiving the at least one instance of the RACH message via the quantity of symbols, wherein receiving the second instance of the RACH message comprises receiving the second instance via the quantity of symbols, and wherein a first position of the quantity of symbols in the first slot correspond to a second position of the quantity of symbols in the second slot.

Aspect 18: The method of aspect 15, wherein receiving the at least one instance of the RACH message comprises: receiving the at least one instance of the RACH message via the first slot and a second slot of the SBFD slot type, wherein the at least one instance of the RACH message is a single instance of the RACH message, wherein the first RACH occasion is included within the first slot and the second slot.

Aspect 19: The method of any of aspects 15 through 18, further comprising: transmitting, with the control signaling, an indication of a second RACH configuration associated with an uplink slot type, the second RACH configuration indicating a second mapping of a second set of SSBs comprising the first set of SSBs to a second set of RACH occasions.

Aspect 20: The method of aspect 19, further comprising: receiving, from the UE via an uplink slot of the uplink slot type in accordance with the second RACH configuration, a second instance of the RACH message via a second RACH occasion of the second set of RACH occasions, wherein the second RACH occasion is mapped to a same SSB of the first set of SSBs as the first RACH occasion.

Aspect 21: The method of aspect 20, wherein the first RACH occasion comprises a different set of frequency resources than the second RACH occasion.

Aspect 22: The method of aspect 20, wherein the first RACH occasion comprises a same set of frequency resources as the second RACH occasion.

Aspect 23: The method of any of aspects 19 through 22, further comprising: receiving the at least one instance of the RACH message via the first slot and an uplink slot of the uplink slot type, wherein the at least one instance of the RACH message is a single instance of the RACH message, wherein the first RACH occasion is included within the first slot and the uplink slot.

Aspect 24: The method of any of aspects 19 through 23, wherein transmitting the control signaling comprises: transmitting the control signaling indicating the first RACH configuration mapping the first set of SSBs to the first set of RACH occasions across two or more slots of the SBFD slot type, wherein the first set of SSBs corresponds to the second set of SSBs, and wherein each of the second set of RACH occasions corresponds to one of the first set of RACH occasions.

Aspect 25: The method of any of aspects 19 through 23, wherein the first set of SSBs is a subset of the second set of SSBs.

Aspect 26: The method of aspect 25, wherein transmitting the control signaling comprises: transmitting the control signaling indicating the first RACH configuration comprising a bitfield indicating the first set of SSBs.

Aspect 27: The method of aspect 25, wherein transmitting the control signaling comprises: transmitting the control signaling indicating the first RACH configuration mapping the first set of SSBs to RACH occasions within the first set of frequency resources and a remainder of the second set of SSBs to RACH occasions within the second set of frequency resources.

Aspect 28: The method of any of aspects 15 through 27, wherein transmitting the control signaling comprises: transmitting the control signaling indicating the first RACH configuration indicating a first quantity of symbols associated with the first set of RACH occasions and a second quantity of symbols associated with repetition for the first set of RACH occasions within a same slot, and wherein receiving the at least one instance of the RACH message comprises receiving the at least one instance of the RACH message via the first quantity of symbols and receiving a second instance of the RACH message via the first uplink subband of the first slot via the second quantity of symbols.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
   receive, from a network entity, control signaling indicating a configuration for a subband full duplex slot type and a first random access channel configuration associated with the subband full duplex slot type, the configuration for the subband full duplex slot type indicating an uplink subband comprising a first set of frequency resources and a downlink subband comprising a second set of frequency resources, the first random access channel configuration indicating a first mapping of a first set of synchronization signal blocks to a first set of random access channel occasions associated with the uplink subband of the subband full duplex slot type;
   receive, with the control signaling, an indication of a second random access channel configuration associated with an uplink slot type, the second random access channel configuration indicating a second mapping of a second set of synchronization signal blocks comprising the first set of synchronization signal blocks to a second set of random access channel occasions; and
   transmit, to the network entity via a first uplink subband of a first slot of the subband full duplex slot type in accordance with the first random access channel configuration, at least one instance of a random access channel message via a first random access channel occasion of the first set of random access channel occasions.

2. The apparatus of claim 1, wherein the instructions are further executable by the one or more processors to cause the apparatus to:
   transmit, to the network entity via a second uplink subband of a second slot of the subband full duplex slot type in accordance with the first random access channel configuration, a second instance of the random access channel message via a second random access channel occasion, wherein the second random access channel occasion is mapped to a same synchronization signal block of the first set of synchronization signal blocks as the first random access channel occasion.

3. The apparatus of claim 2, wherein the instructions to receive the control signaling are executable by the one or more processors to cause the apparatus to:
   receive the control signaling indicating the first random access channel configuration indicating a quantity of symbols associated with the first set of random access channel occasions, and wherein transmitting the at least one instance of the random access channel message comprises transmitting the at least one instance of the random access channel message via the quantity of symbols, wherein transmitting the second instance of the random access channel message comprises transmitting the second instance via the quantity of symbols, and wherein a first position of the quantity of symbols in the first slot correspond to a second position of the quantity of symbols in the second slot.

4. The apparatus of claim 1, wherein the instructions to transmit the at least one instance of the random access channel message are executable by the one or more processors to cause the apparatus to:
transmit the at least one instance of the random access channel message via the first slot and a second slot of the subband full duplex slot type, wherein the at least one instance of the random access channel message is a single instance of the random access channel message, wherein the first random access channel occasion is included within the first slot and the second slot.

5. The apparatus of claim 1, wherein the instructions are further executable by the one or more processors to cause the apparatus to:
transmit, to the network entity via an uplink slot of the uplink slot type in accordance with the second random access channel configuration, a second instance of the random access channel message via a second random access channel occasion of the second set of random access channel occasions, wherein the second random access channel occasion is mapped to a same synchronization signal block of the first set of synchronization signal blocks as the first random access channel occasion.

6. The apparatus of claim 5, wherein the first random access channel occasion comprises a different set of frequency resources than the second random access channel occasion.

7. The apparatus of claim 5, wherein the first random access channel occasion comprises a same set of frequency resources as the second random access channel occasion.

8. The apparatus of claim 1, wherein the instructions are further executable by the one or more processors to cause the apparatus to:
transmit the at least one instance of the random access channel message via the first slot and an uplink slot of the uplink slot type, wherein the at least one instance of the random access channel message is a single instance of the random access channel message, wherein the first random access channel occasion is included within the first slot and the uplink slot.

9. The apparatus of claim 1, wherein the instructions to receive the control signaling are executable by the one or more processors to cause the apparatus to:
receive the control signaling indicating the first random access channel configuration mapping the first set of synchronization signal blocks to the first set of random access channel occasions across two or more slots of the subband full duplex slot type, wherein the first set of synchronization signal blocks corresponds to the second set of synchronization signal blocks, and wherein each of the second set of random access channel occasions corresponds to one of the first set of random access channel occasions.

10. The apparatus of claim 1, wherein the first set of synchronization signal blocks is a subset of the second set of synchronization signal blocks.

11. The apparatus of claim 10, wherein the instructions to receive the control signaling are executable by the one or more processors to cause the apparatus to:
receive the control signaling indicating the first random access channel configuration comprising a bitfield indicating the first set of synchronization signal blocks.

12. The apparatus of claim 10, wherein the instructions to receive the control signaling are executable by the one or more processors to cause the apparatus to:
receive the control signaling indicating the first random access channel configuration mapping the first set of synchronization signal blocks to random access channel occasions within the first set of frequency resources and a remainder of the second set of synchronization signal blocks to random access channel occasions within the second set of frequency resources.

13. The apparatus of claim 1, wherein the instructions to receive the control signaling are executable by the one or more processors to cause the apparatus to:
receive the control signaling indicating the first random access channel configuration indicating a first quantity of symbols associated with the first set of random access channel occasions and a second quantity of symbols associated with repetition for the first set of random access channel occasions within a same slot, and wherein transmitting the at least one instance of the random access channel message comprises transmitting the at least one instance of the random access channel message via the first quantity of symbols and transmitting a second instance of the random access channel message via the first uplink subband of the first slot via the second quantity of symbols.

14. An apparatus for wireless communications at a network entity, comprising:
one or more processors;
one or more memories coupled with the one or more processors; and
instructions stored in the one or more memories and executable by the one or more processors to cause the apparatus to:
transmit, to a user equipment (UE), control signaling indicating a configuration for a subband full duplex slot type and a first random access channel configuration associated with the subband full duplex slot type, the configuration for the subband full duplex slot type indicating an uplink subband comprising a first set of frequency resources and a downlink subband comprising a second set of frequency resources, the first random access channel configuration indicating a first mapping of a first set of synchronization signal blocks to a first set of random access channel occasions associated with the uplink subband of the subband full duplex slot type;
transmit, with the control signaling, an indication of a second random access channel configuration associated with an uplink slot type, the second random access channel configuration indicating a second mapping of a second set of synchronization signal blocks comprising the first set of synchronization signal blocks to a second set of random access channel occasions; and
receive, from the UE via a first uplink subband of a first slot of the subband full duplex slot type in accordance with the first random access channel configuration, at least one instance of a random access channel message via a first random access channel occasion of the first set of random access channel occasions.

15. The apparatus of claim 14, wherein the instructions are further executable by the one or more processors to cause the apparatus to:
receive, from the UE via a second uplink subband of a second slot of the subband full duplex slot type in accordance with the first random access channel configuration, a second instance of the random access channel message via a second random access channel occasion, wherein the second random access channel occasion is mapped to a same synchronization signal block of the first set of synchronization signal blocks as the first random access channel occasion.

16. The apparatus of claim 15, wherein the instructions to transmit the control signaling are executable by the one or more processors to cause the apparatus to:
transmit the control signaling indicating the first random access channel configuration indicating a quantity of symbols associated with the first set of random access channel occasions, and wherein receiving the at least one instance of the random access channel message comprises receiving the at least one instance of the random access channel message via the quantity of symbols, wherein receiving the second instance of the random access channel message comprises receiving the second instance via the quantity of symbols, and wherein a first position of the quantity of symbols in the first slot correspond to a second position of the quantity of symbols in the second slot.

17. The apparatus of claim 14, wherein the instructions to receive the at least one instance of the random access channel message are executable by the one or more processors to cause the apparatus to:
receive the at least one instance of the random access channel message via the first slot and a second slot of the subband full duplex slot type, wherein the at least one instance of the random access channel message is a single instance of the random access channel message, wherein the first random access channel occasion is included within the first slot and the second slot.

18. The apparatus of claim 14, wherein the instructions are further executable by the one or more processors to cause the apparatus to:
receive, from the UE via an uplink slot of the uplink slot type in accordance with the second random access channel configuration, a second instance of the random access channel message via a second random access channel occasion of the second set of random access channel occasions, wherein the second random access channel occasion is mapped to a same synchronization signal block of the first set of synchronization signal blocks as the first random access channel occasion.

19. The apparatus of claim 18, wherein the first random access channel occasion comprises a different set of frequency resources than the second random access channel occasion.

20. The apparatus of claim 18, wherein the first random access channel occasion comprises a same set of frequency resources as the second random access channel occasion.

21. The apparatus of claim 14, wherein the instructions are further executable by the one or more processors to cause the apparatus to:
receive the at least one instance of the random access channel message via the first slot and an uplink slot of the uplink slot type, wherein the at least one instance of the random access channel message is a single instance of the random access channel message, wherein the first random access channel occasion is included within the first slot and the uplink slot.

22. The apparatus of claim 14, wherein the instructions to transmit the control signaling are executable by the one or more processors to cause the apparatus to:
transmit the control signaling indicating the first random access channel configuration mapping the first set of synchronization signal blocks to the first set of random access channel occasions across two or more slots of the subband full duplex slot type, wherein the first set of synchronization signal blocks corresponds to the second set of synchronization signal blocks, and wherein each of the second set of random access channel occasions corresponds to one of the first set of random access channel occasions.

23. The apparatus of claim 14, wherein the first set of synchronization signal blocks is a subset of the second set of synchronization signal blocks.

24. The apparatus of claim 23, wherein the instructions to transmit the control signaling are executable by the one or more processors to cause the apparatus to:
transmit the control signaling indicating the first random access channel configuration comprising a bitfield indicating the first set of synchronization signal blocks.

25. The apparatus of claim 23, wherein the instructions to transmit the control signaling are executable by the one or more processors to cause the apparatus to:
transmit the control signaling indicating the first random access channel configuration mapping the first set of synchronization signal blocks to random access channel occasions within the first set of frequency resources and a remainder of the second set of synchronization signal blocks to random access channel occasions within the second set of frequency resources.

26. The apparatus of claim 14, wherein the instructions to transmit the control signaling are executable by the one or more processors to cause the apparatus to:
transmit the control signaling indicating the first random access channel configuration indicating a first quantity of symbols associated with the first set of random access channel occasions and a second quantity of symbols associated with repetition for the first set of random access channel occasions within a same slot, and wherein receiving the at least one instance of the random access channel message comprises receiving the at least one instance of the random access channel message via the first quantity of symbols and receiving a second instance of the random access channel message via the first uplink subband of the first slot via the second quantity of symbols.

27. A method for wireless communications at a user equipment (UE), comprising:
receiving, from a network entity, control signaling indicating a configuration for a subband full duplex slot type and a first random access channel configuration associated with the subband full duplex slot type, the configuration for the subband full duplex slot type indicating an uplink subband comprising a first set of frequency resources and a downlink subband comprising a second set of frequency resources, the first random access channel configuration indicating a first mapping of a first set of synchronization signal blocks to a first set of random access channel occasions associated with the uplink subband of the subband full duplex slot type;

receiving, with the control signaling, an indication of a second random access channel configuration associated with an uplink slot type, the second random access channel configuration indicating a second mapping of a second set of synchronization signal blocks comprising the first set of synchronization signal blocks to a second set of random access channel occasions; and transmitting, to the network entity via a first uplink subband of a first slot of the subband full duplex slot type in accordance with the first random access channel configuration, at least one instance of a random access channel message via a first random access channel occasion of the first set of random access channel occasions.

28. The method of claim 27, further comprising:
transmitting, to the network entity via a second uplink subband of a second slot of the subband full duplex slot type in accordance with the first random access channel configuration, a second instance of the random access channel message via a second random access channel occasion, wherein the second random access channel occasion is mapped to a same synchronization signal block of the first set of synchronization signal blocks as the first random access channel occasion.

29. A method for wireless communications at a network entity, comprising:
transmitting, to a user equipment (UE), control signaling indicating a configuration for a subband full duplex slot type and a first random access channel configuration associated with the subband full duplex slot type, the configuration for the subband full duplex slot type indicating an uplink subband comprising a first set of frequency resources and a downlink subband comprising a second set of frequency resources, the first random access channel configuration indicating a first mapping of a first set of synchronization signal blocks to a first set of random access channel occasions associated with the uplink subband of the subband full duplex slot type;

transmitting, with the control signaling, an indication of a second random access channel configuration associated with an uplink slot type, the second random access channel configuration indicating a second mapping of a second set of synchronization signal blocks comprising the first set of synchronization signal blocks to a second set of random access channel occasions; and receiving, from the UE via a first uplink subband of a first slot of the subband full duplex slot type in accordance with the first random access channel configuration, at least one instance of a random access channel message via a first random access channel occasion of the first set of random access channel occasions.

30. The method of claim 29, further comprising:
receiving, from the UE via a second uplink subband of a second slot of the subband full duplex slot type in accordance with the first random access channel configuration, a second instance of the random access channel message via a second random access channel occasion, wherein the second random access channel occasion is mapped to a same synchronization signal block of the first set of synchronization signal blocks as the first random access channel occasion.

* * * * *